United States Patent
Ning et al.

(10) Patent No.: US 11,634,079 B2
(45) Date of Patent: Apr. 25, 2023

(54) LIDAR MIRROR SENSOR ASSEMBLY

(71) Applicant: TUSIMPLE, INC., San Diego, CA (US)

(72) Inventors: Juexiao Ning, Tucson, AZ (US); Todd Skinner, San Diego, CA (US); Jeffrey Renn, Green Valley, AZ (US)

(73) Assignee: TUSIMPLE, INC., San Diego, CA (US)

( * ) Notice: Subject to any disclaimer, the term of this patent is extended or adjusted under 35 U.S.C. 154(b) by 837 days.

(21) Appl. No.: 16/527,347

(22) Filed: Jul. 31, 2019

(65) Prior Publication Data

US 2021/0031692 A1    Feb. 4, 2021

(51) Int. Cl.
*B60R 1/12* (2006.01)
*G01S 17/931* (2020.01)
*B60R 11/00* (2006.01)
*G01S 7/481* (2006.01)

(52) U.S. Cl.
CPC ............... *B60R 1/12* (2013.01); *B60R 11/00* (2013.01); *G01S 7/4813* (2013.01); *G01S 17/931* (2020.01); *B60R 2001/1223* (2013.01); *B60R 2011/004* (2013.01); *B60R 2011/008* (2013.01)

(58) Field of Classification Search
CPC .............. B60R 1/12; B60R 2001/1223; B60R 2011/004; B60R 2011/008; B60R 1/006; B60R 1/06; B60R 11/004; G01S 7/4813
See application file for complete search history.

(56) References Cited

U.S. PATENT DOCUMENTS

| | | | |
|---|---|---|---|
| 2,226,482 A * | 12/1940 | Sarnes | B60R 1/06 359/872 |
| 4,640,142 A * | 2/1987 | Cummins | B60R 1/06 359/872 |
| 5,889,624 A * | 3/1999 | Dickenson | B60R 1/07 359/872 |
| 10,564,261 B2 * | 2/2020 | Huebner | G01S 17/931 |

(Continued)

FOREIGN PATENT DOCUMENTS

| | | |
|---|---|---|
| AU | 2020205280 A1 | 2/2021 |
| CN | 112305551 A | 2/2021 |
| EP | 3771923 A1 | 2/2021 |

OTHER PUBLICATIONS

Extended European Search Report for European Patent Application No. 20188297.4, dated Nov. 26, 2020.

(Continued)

*Primary Examiner* — Christopher Garft
(74) *Attorney, Agent, or Firm* — Paul Liu; Henrik Keshishian; Perkins Coie, LLP

(57) ABSTRACT

Disclosed are devices, systems, and methods for a LiDAR mirror assembly mounted on a vehicle, such as an autonomous or semi-autonomous vehicle. For example, a LiDAR mirror assembly may include a base plate mounted on a hood of a vehicle, where the base plate is coupled to one end of a support arm. The opposite end of the support arm is attached to a housing. The housing includes a top housing enclosure coupled to a bottom housing platform, where a sensor and a mirror is coupled to the housing, and where the sensor is at least partially exposed through an opening in the top housing enclosure. The opening for the sensor is situated near an end of the housing furthest away from the base plate.

14 Claims, 11 Drawing Sheets

(56) References Cited

U.S. PATENT DOCUMENTS

| | | | | |
|---|---|---|---|---|
| 2007/0023611 | A1* | 2/2007 | Saccagno | B60R 1/12 |
| | | | | 250/208.1 |
| 2009/0284599 | A1* | 11/2009 | Wagner | B60R 1/00 |
| | | | | 348/148 |
| 2013/0242586 | A1* | 9/2013 | Huizen | F21S 43/249 |
| | | | | 362/494 |
| 2013/0250445 | A1* | 9/2013 | Mueller | B60R 1/006 |
| | | | | 359/844 |
| 2014/0168438 | A1* | 6/2014 | Park | B60R 1/12 |
| | | | | 348/148 |
| 2017/0210282 | A1 | 7/2017 | Rodriguez Barros | |
| 2018/0032822 | A1* | 2/2018 | Frank | H04N 13/20 |
| 2018/0329036 | A1* | 11/2018 | Huebner | G01S 7/4813 |
| 2019/0204845 | A1 | 7/2019 | Grossman et al. | |

OTHER PUBLICATIONS

European Examination Report from corresponding EP Application No. 20188297.4, dated Dec. 23, 2022 (5 pages).

* cited by examiner

LIDAR MIRROR SENSOR ASSEMBLY

TECHNICAL FIELD

This document relates to sensors for operating vehicles.

BACKGROUND

Vehicles can be autonomously controlled to navigate along a path to a destination. Such autonomous vehicles include at least one sensor that gather information about their surrounding environment. Autonomous vehicles analyze the gathered sensor information to select trajectories that avoid collisions and guide the autonomous vehicle to the desired location. One of the sensors on autonomous vehicles can be a light detection and ranging (LiDAR) sensor that uses light pulses to measure distances to various objects surrounding the autonomous vehicles.

SUMMARY

Disclosed are devices, systems, and methods for a light detection and ranging (LiDAR) mirror assembly coupled to a vehicle, such as an autonomous or semi-autonomous vehicle.

In one example aspect, a sensor device is disclosed. The sensor device includes a base plate, a housing, and a mirror pivotably coupled to the housing. The housing comprising a top housing enclosure coupled to a bottom housing platform, where the bottom housing platform is coupled to the base plate via a support arm, where the support arm includes a first end coupled to the bottom housing platform and a second end coupled to the base plate, where the top housing enclosure and the bottom housing platform having a first end proximal to the base plate and a second end distal to the base plate, where the second end of the top housing enclosure has an opening within which a sensor is located and coupled to the housing, and where at least some surface of the sensor is exposed through the opening. The sensor device also includes a mirror pivotably coupled to the housing and located adjacent to a side surface of the top housing enclosure and the bottom housing platform at the first end.

In some embodiments, the support arm is oriented at an oblique angle with respect to a surface of the base plate. In some embodiments, the base plate includes an aperture, and where the second end of the support arm is coupled to the base plate at the aperture. In some embodiments, the support arm has a hollow cylindrical shape. In some embodiments, the mirror is pivotably coupled to the housing via a bracket that extends from a top surface of the bottom housing platform. In some embodiments, the second end of the top housing enclosure and the bottom housing platform has a semi-circular shape. In some embodiments, the sensor is a light detection and ranging (LiDAR) sensor. In some embodiments, the top housing enclosure includes a cutout on a second side surface opposite to the side surface, where the cutout extends laterally along the second side surface, and where the cutout includes a light-emitting diode (LED).

In some embodiments, the sensor device further comprises a second support arm including a first end coupled to the bottom housing platform and a second end coupled to the base plate is coupled to the base plate via a support arm, where the first end of the support arm and the first end of the second support arm are coupled to different regions of the bottom housing platform, and where the second end of the support arm and the second end of the second support arm are coupled to different regions of the base plate. In some embodiments, the at least some surface of the sensor is recessed from an edge of the top housing enclosure at the second end.

In another example aspect, a method of sensor device assembly is disclosed. The method comprises coupling a first end of one or more support arms to a base plate, coupling a second end of the one or more support arms to a bottom surface of a bottom housing platform, coupling a sensor to a top surface of the bottom housing platform, where the bottom housing platform has a first end proximal to the base plate and a second end distal to the base plate, and where the sensor is located at the second end of the bottom housing platform, coupling a mirror to a bracket that extends from the top surface of the bottom housing platform, inserting a light-emitting diode (LED) through a cutout on a top housing enclosure, inserting electrical wires through the one or more support arms via one or more apertures in the base plate to connect to the sensor and the LED, and coupling the top housing enclosure to the bottom housing platform, where the top housing enclosure has a first end proximal to the base plate and a second end distal to the base plate, and where the second end of the top housing enclosure has an opening through which at least some surface of the sensor is exposed.

In some embodiments, the one or more support arms are oriented at an oblique angle with respect to a surface of the base plate. In some embodiments, a first shape of an exterior surface of the top housing enclosure is the same as a second shape of an exterior surface of the bottom housing platform. In some embodiments, the sensor is a light detection and ranging (LiDAR) sensor. In some embodiments, the method further comprises coupling the base plate to a hood of a vehicle. In some embodiments, the at least some surface of the sensor is recessed from an edge of the top housing enclosure at the second end.

In yet another example aspect, a system is disclosed. The system includes a vehicle operable to drive on a road, the vehicle comprising a light detection and ranging (LiDAR) assembly mounted on a periphery of a front side of the vehicle. The LiDAR assembly comprises a base plate, where the base plate is coupled to a hood of the vehicle. a housing comprising a top housing enclosure coupled to a bottom housing platform, where the bottom housing platform is coupled to the base plate via a support arm, where the support arm includes a first end coupled to the bottom housing platform and a second end coupled to the base plate, where the top housing enclosure and the bottom housing platform having a first end proximal to the base plate and a second end distal to the base plate, where the second end of the top housing enclosure has an opening within which a LiDAR sensor is located and coupled to the housing, and where at least some surface of the LiDAR sensor is exposed through the opening, and a mirror pivotably coupled to the housing and located adjacent to a side surface of the top housing enclosure and the bottom housing platform at the first end.

In some embodiments, the support arm is oriented at an oblique angle with respect to a surface of the base plate. In some embodiments, the base plate includes an aperture, and where the second end of the support arm is coupled to the base plate at the aperture. In some embodiments, the at least some surface of the LiDAR sensor is recessed from an edge of the top housing enclosure at the second end.

The above and other aspects and features of the disclosed technology are described in greater detail in the drawings, the description and the claims.

BRIEF DESCRIPTION OF THE DRAWINGS

The various embodiments are illustrated by way of example, and not by way of limitation, in the figures of the accompanying drawings.

Identical reference numerals have been used, where possible, to designate identical elements that are common to the figures. It is contemplated that elements disclosed in one implementation may be beneficially utilized in other implementations without specific recitation.

DETAILED DESCRIPTION

A light detection and ranging (LiDAR) sensor measures distance by illuminating a target with a laser light. The laser light is reflected back to the LiDAR, providing information about potential obstacles and the surrounding environment of the autonomous vehicle. The LiDAR rapidly scans across the environment of the autonomous vehicle to provide continuous real time information on distances. The autonomous vehicle and its software select trajectories based on the information about the surrounding environment. The LiDAR can be positioned such that it can have a direct line of sight to the potential obstacles. The vantage point of the LiDAR on the autonomous vehicle can allow the LiDAR to provide information about the autonomous vehicle's environment. This patent document describes exemplary embodiments of a LiDAR mirror assembly that can be coupled to a vehicle's provide information about the vehicle's environment.

Figure 8:
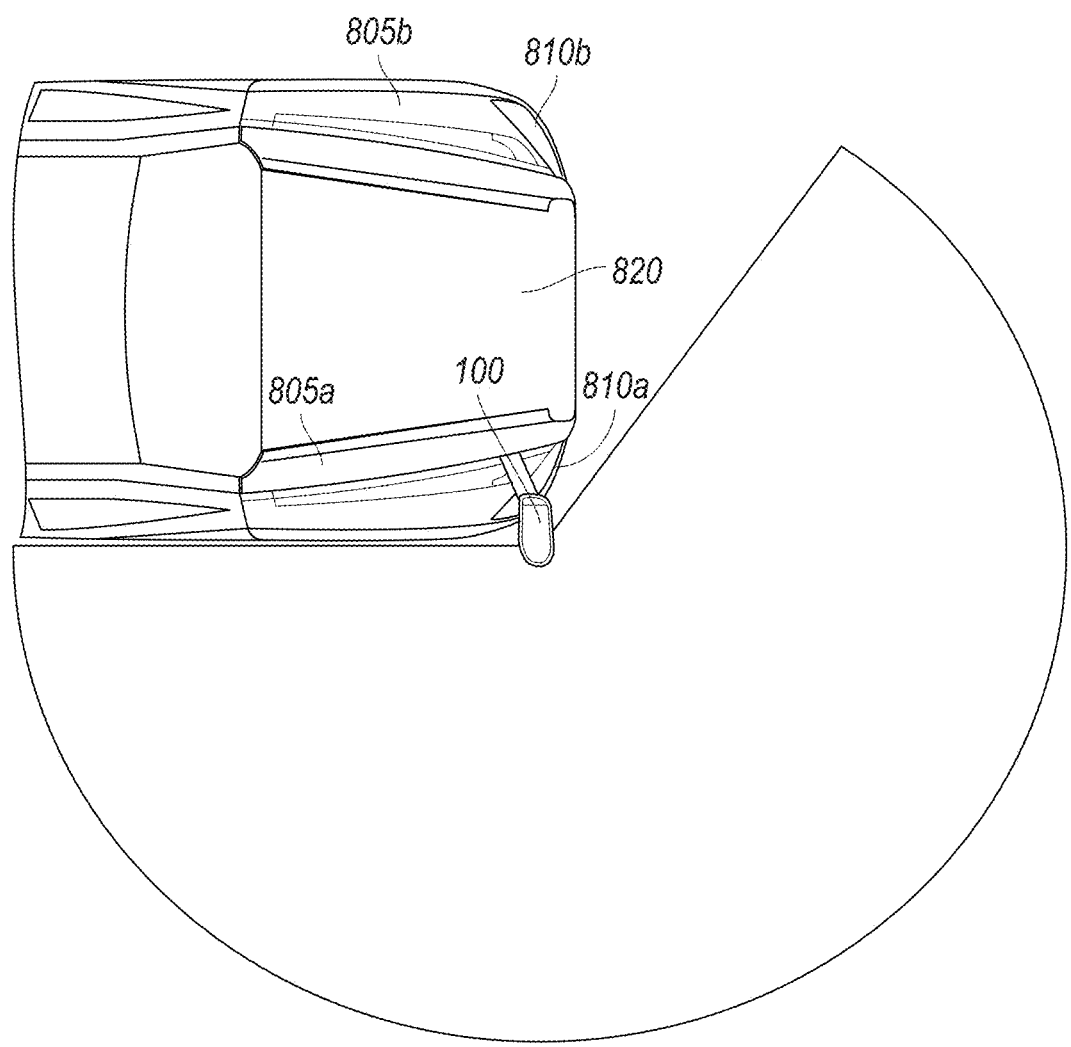
FIG. 8 shows an exemplary field of vision of an exemplary LiDAR mirror assembly coupled to an autonomous semi-trailer truck from a top view.
Figure 9:
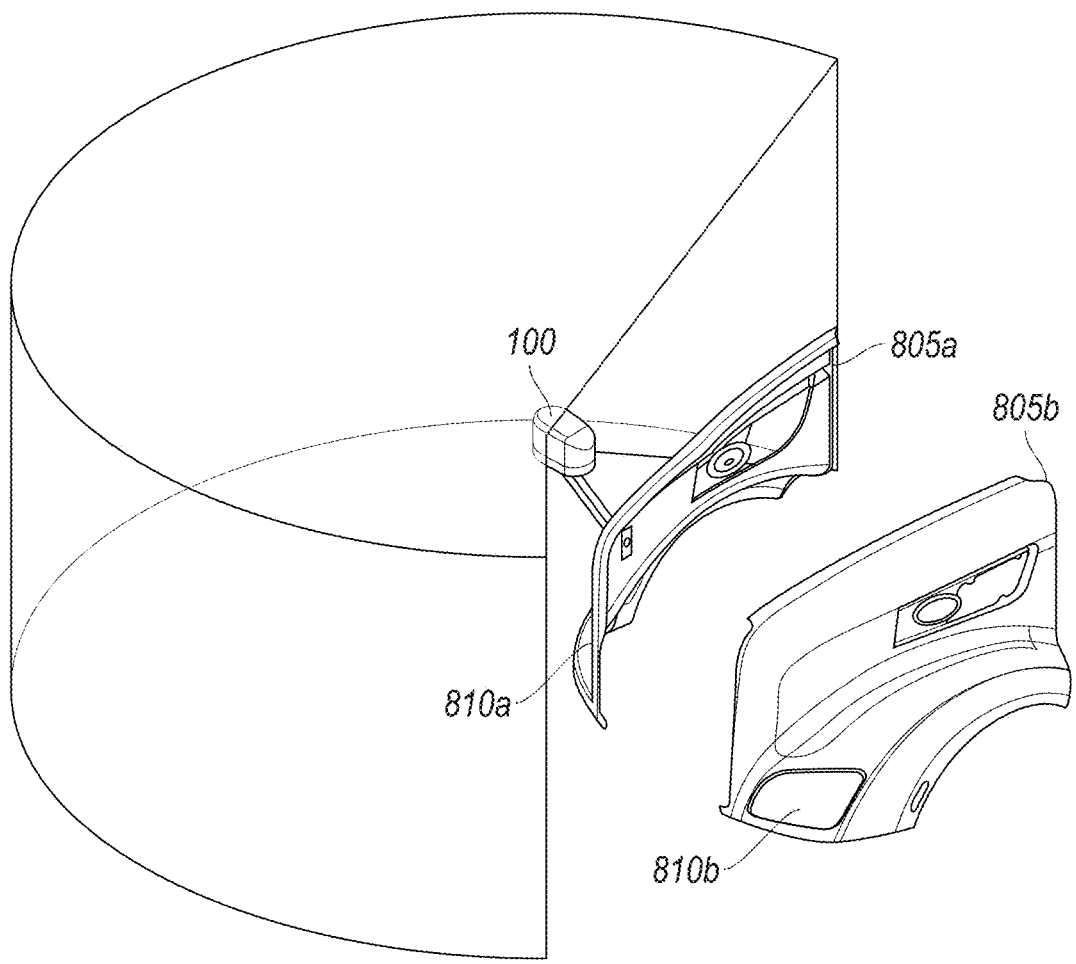
FIG. 9 shows an exemplary field of vision of an exemplary LiDAR mirror assembly coupled to an autonomous semi-trailer truck from a side view.

FIGS. 1 to 4 shows various exploded views of a first exemplary LiDAR mirror assembly with two support arms. The exemplary embodiments for the LiDAR mirror assembly can be mounted on a vehicle as shown in FIGS. 8 and 9. In FIGS. 8 and 9, the front side of the LiDAR mirror assembly faces toward the vehicle cabin where a driver sits, and the back side of the LiDAR mirror assembly faces in the opposite direction.

Figure 1:
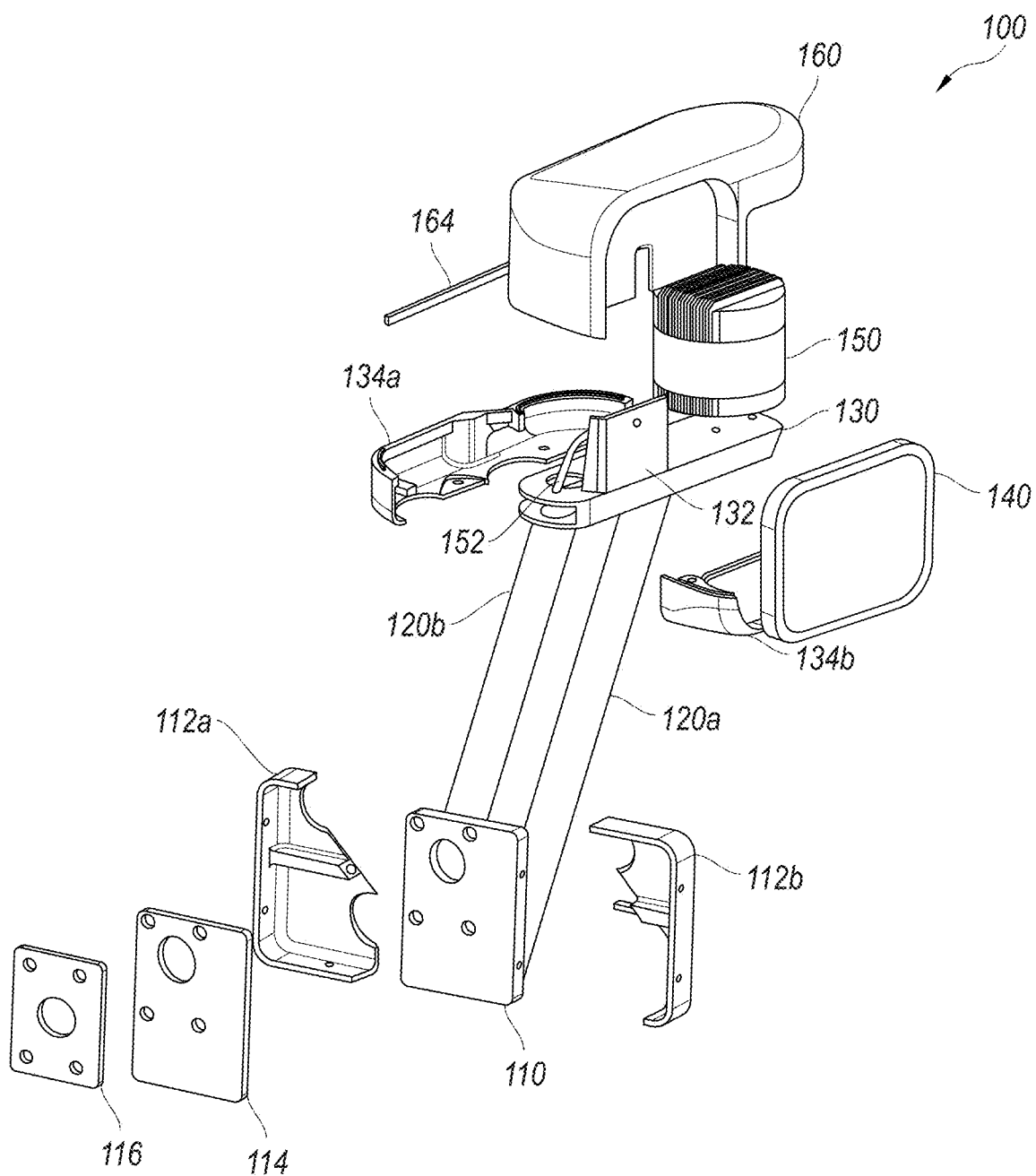
FIG. 1 shows an exploded view of a front side of a first exemplary LiDAR mirror assembly.
Figure 2:
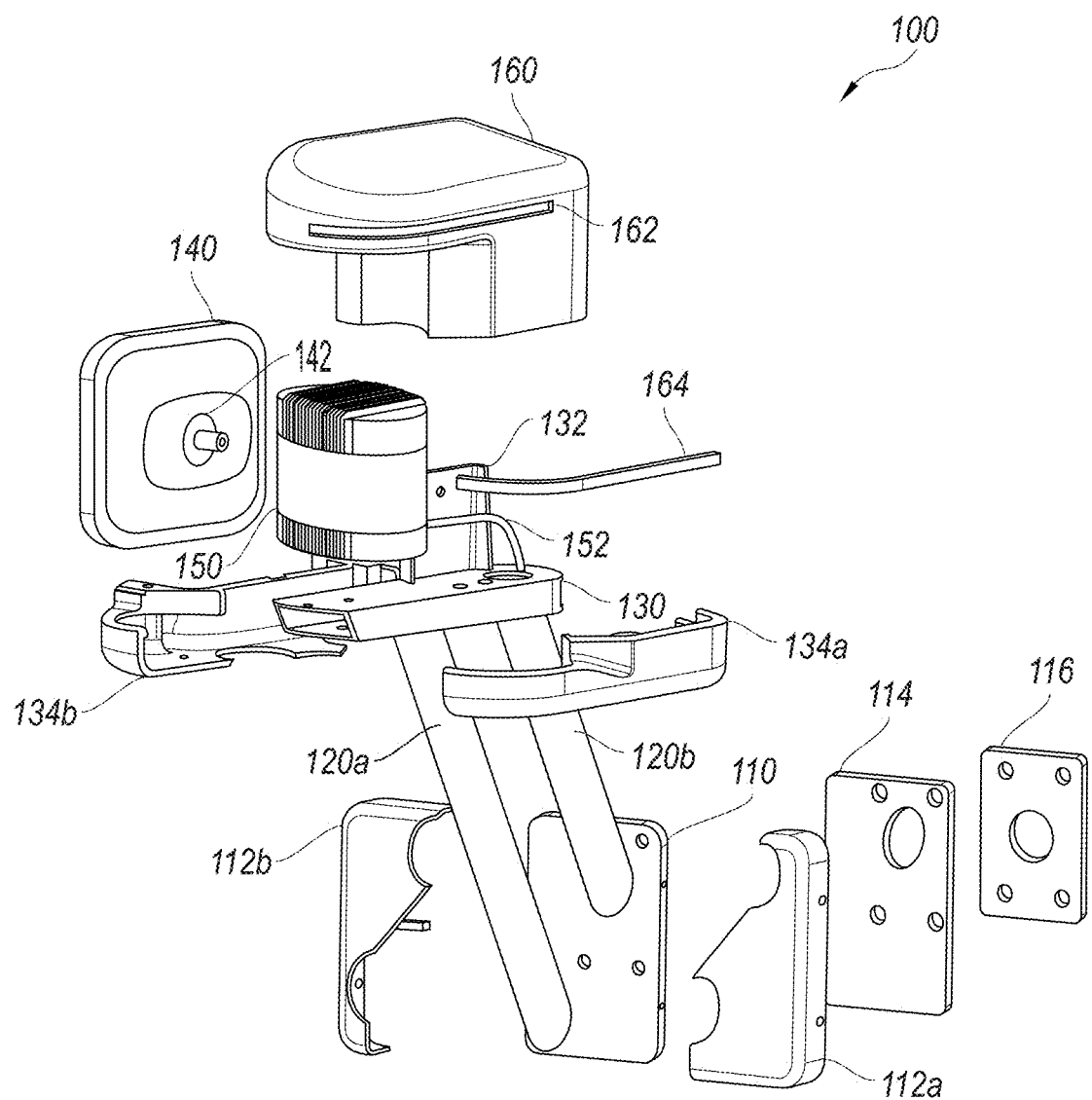
FIG. 2 shows another exploded view of a back side the first exemplary LiDAR mirror assembly.
Figure 3:
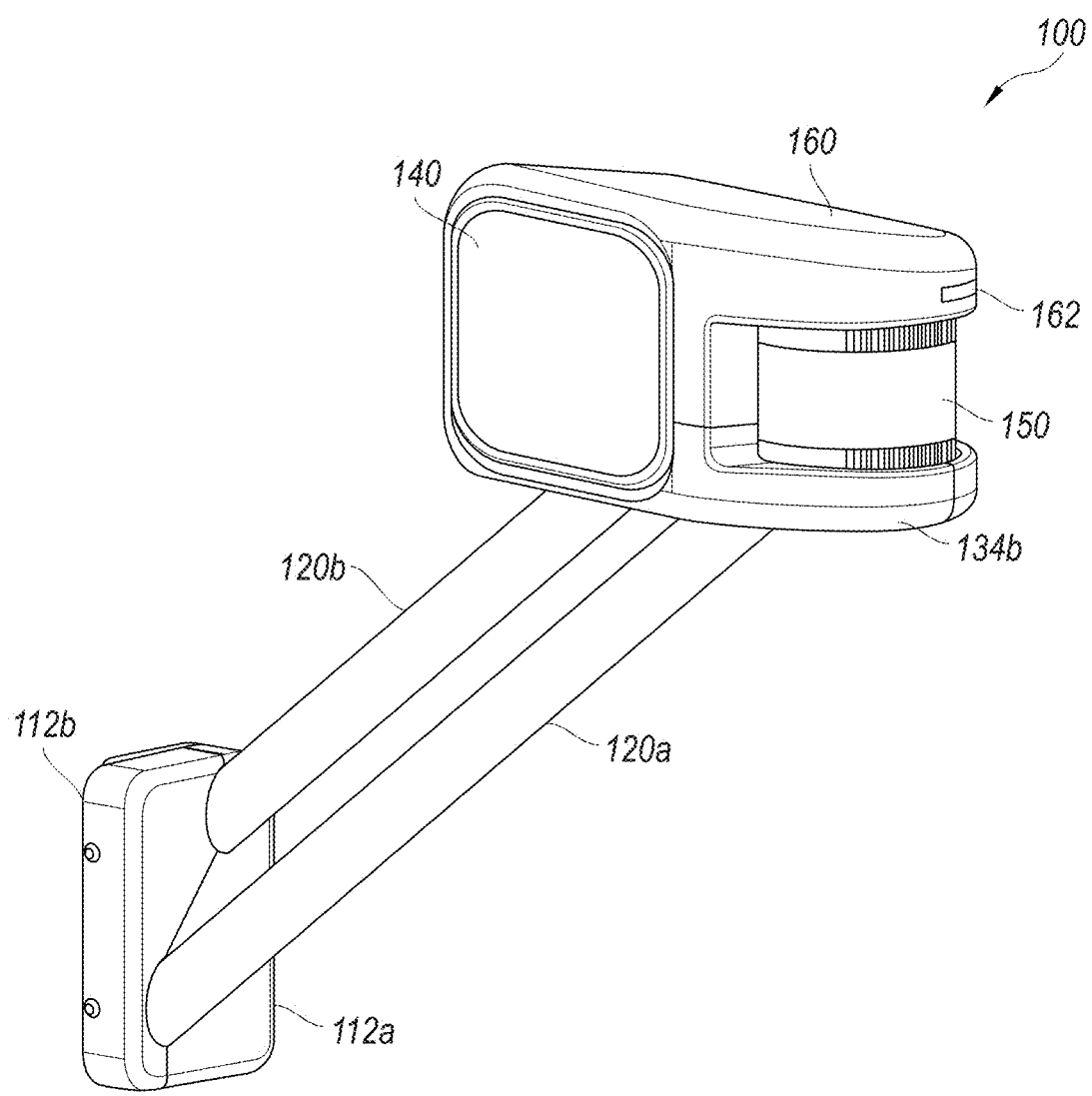
FIG. 3 shows an assembled view of a front side of the first exemplary LiDAR mirror assembly.
Figure 4:
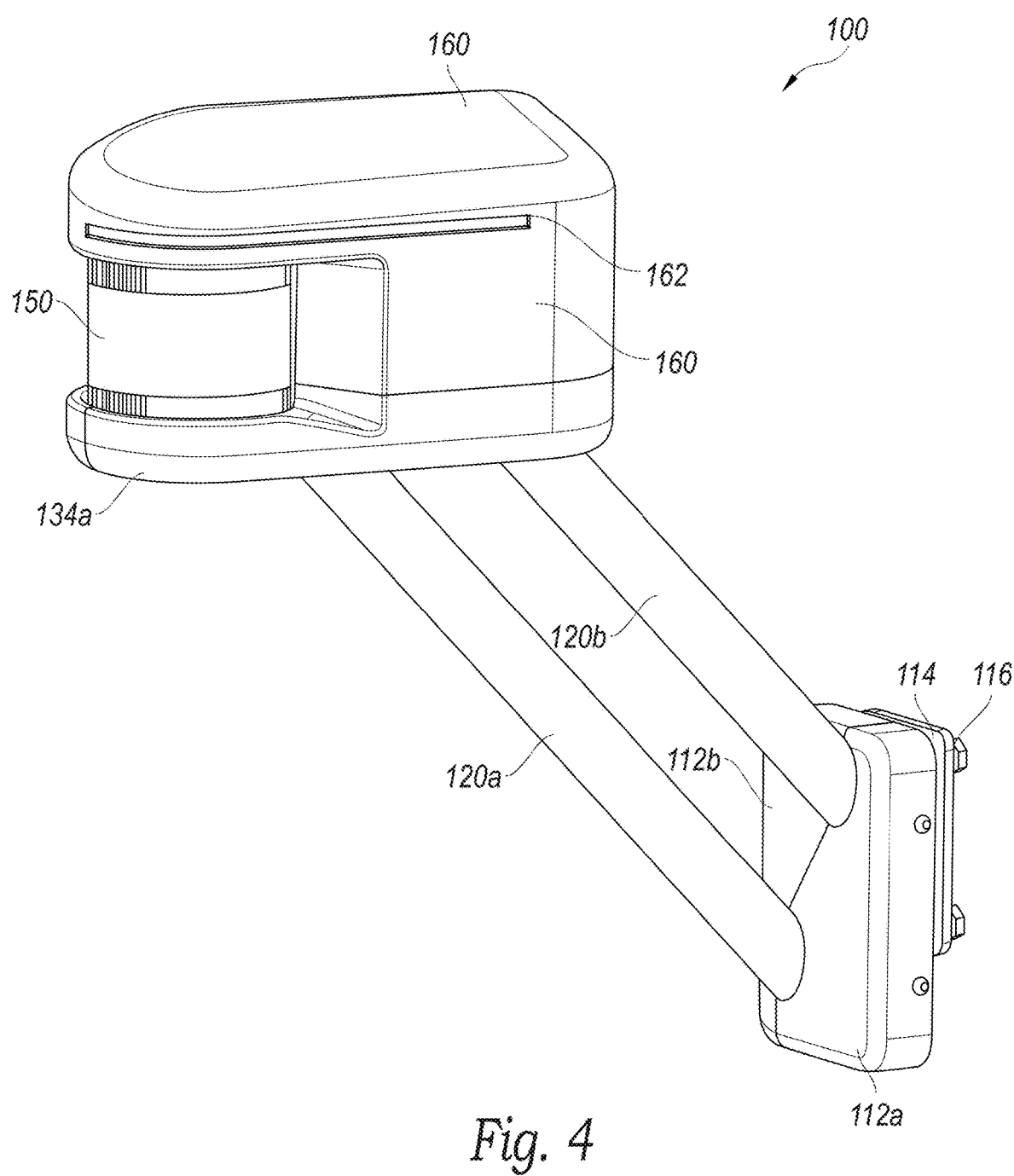
FIG. 4 shows another assembled view of a back side of the first exemplary LiDAR mirror assembly.

FIG. 1 shows an exploded view of a front side of a first exemplary LiDAR mirror assembly. The LiDAR mirror assembly 100 includes a base plate 110 that is coupled to a first support arm 120a and a second support arm 120b. One end of both the first support arm 120a and second support arm 120b are coupled to a bottom housing platform 130. The bottom housing platform 130 is coupled to a mirror bracket 132. The mirror bracket 132 is coupled to mirror 140 via ball swivel mounting fixture 142. The bottom housing platform 130 is coupled to a sensor 150. The bottom housing platform 130 supports the mirror 140 via the mirror bracket 132. Sensor 150 includes sensor wire 152. The bottom housing platform 130 couples to a top housing enclosure 160. Top housing enclosure 160 includes a light-emitting diode (LED) 164. LED 164 includes an LED wire. Top housing enclosure 160 include an opening located at a distal end of the housing away from the base plate 110 so that a sensor 150 can be located within the opening of the housing and so that the opening exposes at least some portion of the sensor to the environment. Optionally, first base plate enclosure 112a and second base plate enclosure 112b cover base plate 110. Optionally, gasket 114 is coupled to base plate 110. Optionally, interior plate 116 is coupled to gasket 114 or base plate 110. LiDAR mirror may be coupled to a vehicle, such as a semi-trailer truck.

In FIG. 1, the base plate 110 is substantially planar. In at least one embodiment, base plate 110 is vertically oriented so that the base plate 110 can be installed to an outer vertical portion of the vehicle. Base plate 110 may be convex or concave to match the contour of a vehicle. Base plate 110 may have a rectangular shape or any other polygon shape. Base plate 110 may have a circular or oval shape. Base plate 110 may have beveled edges. Base plate 110 may have square corners or rounded corners. Base plate 110 may be configured to couple to the outer portion of the vehicle with a mounting fixture such as a screw, a bolt, a velcro, a glue, a tab and insert, a hook-and-loop device, an adhesive, or a tape.

Base plate 110 has an outer surface and an inner surface. The outer surface of base plate 110 may be substantially flat. The inner surface of base plate 110 may be substantially flat. The outer surface of base plate 110 may be flat while the inner surface of the base plate 110 is convex or concave. Alternatively, the inner surface of base plate 110 may be flat while the outer surface is convex or concave.

In some embodiments, base plate 110 includes at least one aperture. The aperture is configured to receive either the first support arm 120a or the second support arm 120b. The aperture in the base plate 110 allows wires to travel from the vehicle, through the base plate 110, through at least one support arm that may be hollow, and through the aperture in the bottom housing platform 130 to be connected to the sensor 150 and/or the light-emitting diode (LED) 164. In some embodiments, the base plate 110 may include two apertures, where a first aperture is structured to receive a first support arm 120a and a second aperture is structured to receive the second support arm 120b.

The aperture in the base plate 110 may be circular or a polygon. In a circular configuration, the aperture may have a diameter equal to or wider than the end of the first support arm 120a and/or the end of second support arm 120b. In a polygon configuration, the aperture may have a perimeter equal to or wider than the end of the first support arm 120a and/or the end of the second support arm 120b. In at least one embodiment, the first support arm 120a and/or second support arm 120b is coupled to the base plate 110 at the one or more apertures. In some embodiments, the ends of the first support arm 120a and the second support arm 120b are narrower than the aperture.

The first end of the first support arm 120a and the first end of the second support arm 120b are coupled to different regions of the bottom surface of the bottom housing platform 130. The second end of the first support arm 120a and the second end of the second support arm 120b are coupled to different regions of the base plate 110. For example, the first support arm 120a is coupled to a bottom left area of the base plate 110 and the second support arm 120b is coupled to a top right area of the base station 110. The first support arm 120a and the second support arm 120b extend along an imaginary longitudinal axis that is oriented at an oblique angle with respect to a surface of the base plate 110.

Base plate 110 may include holes that pass through the entire base plate 110. The holes may be used for a mounting fixture. Mounting fixtures may include a screw, a bolt, a nail, an adhesive, a velcro, a glue, a hook-and-loop device, a tab and insert, a hook, or a tape. Base plate 110 may include holes located in the center of the base plate 110. The holes may be off-centered. In at least one embodiment, the holes are located near an outer-right section of the base plate 110. In some embodiments, the holes may be arranged around the at least one aperture.

Base plate 110 may be made from a metal, such as aluminum or an aluminum alloy. Base plate 110 may also be made from plastic or any other material with qualities such as high strength, high resistance to corrosion, and light weight.

Optionally, first base plate enclosure 112a and second base plate enclosure 112b cover base plate 110. First base plate enclosure 112a and second base plate enclosure 112b include openings to allow the first support arm 120a and second support arm 120b to pass through first base plate enclosure 112a and second base plate enclosure 112b to the base plate 110. First base plate enclosure 112a and second base plate enclosure 112b are configured to couple together, covering the base plate 110. First base plate enclosure 112a and second base plate enclosure 112b can couple together using a screw, a bolt, a velcro, a glue, a tab and insert, a hook-and-loop device, an adhesive, or a tape. First base plate enclosure 112a and second base plate enclosure 112b may cover the side surface of base plate 110. In some embodiments, first base plate enclosure 112a and second base plate enclosure 112b are made from a metal, such as an aluminum or an aluminum alloy. First base plate enclosure 112a and second base plate enclosure 112b may also be made from plastic or any other material with qualities such as high strength, high resistance to corrosion, and light weight.

Optionally, gasket 114 is coupled to base plate 110. One side of gasket 114 is flush with base plate 110. The opposite side of gasket 114 may be flush with the vehicle's hood (shown as 820 in FIG. 8) and/or the interior plate 116. Gasket 114 may be made from a rubber material to provide a seal and uniform contact with the hood of the vehicle and base plate 110.

In some embodiments, gasket 114 has the same shape and size as base plate 110. In other embodiments, gasket 114 is larger or smaller than base plate 110. In some embodiments, gasket 114 has holes and apertures aligned with the holes and apertures of base plate 110. Gasket 114 may include holes corresponding to the aperture of the base plate 110. In some embodiments, the hole corresponding to the aperture of the base plate 110 in gasket 114 allows wires to pass from the base plate 110 to the interior of the vehicle. In some embodiments, holes in the gasket 114 correspond to the holes that pass through the entire base plate 110. These holes in the gasket allow the mounting fixtures of base plate 110, such as a screw, bolt, or nail, to pass through gasket 114. In some embodiments, the pressure applied to the gasket 114 couples the gasket 114 to the base plate 110.

Optionally, interior plate 116 is coupled to gasket 114. In some embodiments, interior plate 116 has the same shape and size as base plate 110. In other embodiments, interior plate 116 is larger or smaller than base plate 110. In some embodiments, interior plate 116 is made of the same material as base plate 110. In some embodiments, interior plate 116 has holes and apertures that match base plate 110.

Interior plate 116 may be installed on the interior of the vehicle's hood. For example, the interior plate 116 may be installed underneath the hood on the interior side of the hood. In some embodiments, the interior plate 116 has a convex or concave shape to match the contour of a portion of a vehicle's hood. The shape of the interior plate 116 is such that one side of the interior plate 116 is flush with an interior portion of the vehicle's hood. In some embodiments, interior plate 116 may be installed to an exterior portion of the vehicle's hood. Interior plate 116 may be configured to couple to a vehicle's hood with a mounting fixture such as a screw, a bolt, a velcro, a glue, a tab and insert, a hook-and-loop device, an adhesive, or a tape.

Interior plate 116 may include at least one hole corresponding to the aperture of the base plate 110. In some embodiments, the hole allows wires to pass from the base plate 110 to the vehicle's hood. In some embodiments, holes exist in the interior plate 116 that correspond to the holes passing through the entire base plate 110. These holes in the interior plate 116 allow the mounting fixtures, such as a screw, bolt, or nail, to pass through interior plate 116, coupling the interior plate 116 to the base plate 110.

Interior plate 116 may be made from a metal, such as aluminum or an aluminum alloy. Interior plate 116 may also be made from plastic or any other material with qualities such as high strength, high resistance to corrosion, and light weight.

Base plate 110 is coupled to the first support arm 120a and the second support arm 120b. The first support arm 120a and the second support arm 120b extend from the base plate 110 to the bottom housing platform 130. First support arm 120a and second support arm 120b extend in a direction away from base plate 110. In some embodiments, first support arm 120a and second support arm 120b extend in a diagonal direction away from base plate 110. In some embodiments, first support arm 120a and second support arm 120b are perpendicular to the base plate 110.

First support arm 120a and second support arm 120b are elongated in one direction. In some embodiments, first support arm 120a and second support arm 120b have the shape of a tube or pipe. The first support arm 120a and second support arm 120b may be hollow. The first support arm 120a and second support arm 120b may have a cylindrical shape or a polygonal shape. In some embodiments, the shape of the first support arm 120a and second support arm 120b match the shape of the aperture of base plate 110. The first support arm 120a and second support arm 120b have a first end and a second end. In some embodiments, the first and/or second support arms is/are hollow along their longitudinal axis so that wires can pass through the hollow first support arm 120a and/or second support arm 120b, allowing the LiDAR mirror assembly 100 to be communicatively coupled to and powered by the electronics of the vehicle. The first support arm 120a and the second support arm 120b can have a hollow cylindrical shape. In at least one embodiment, a first end of either the first support arm 120a or the second support arm 120b is attached to the base plate 110. In at least one embodiment, a second end of either the first support arm 120a or the second support arm 120b is attached to the housing, such as the bottom housing platform 130.

First support arm 120a and second support arm 120b are attached to an outer surface of the base plate 110. Base plate 110 may include at least one aperture. In some embodiments, first support arm 120a and second support arm 120b are attached to an outer surface of the base plate 110 at the location of the aperture on base plate 110. First support arm 120a and second support arm 120b may connect to the outer surface of the base plate 110 around the aperture of the base plate 110. In other embodiments, the first support arm 120a or the second support arm may partially pass through the aperture of the base plate 110. In some embodiments, either the first end or the second end of the first support arm 120a or the second support arm 120b is flush with the inner surface of the base plate 110. Both the first support arm 120a and the second support arm 120b may be connected to multiple apertures of base plate 110. The end of the first support arm 120a or the end of the second support arm 120b may have a diameter equal to or narrower than the end of the aperture of the base plate 110. In some embodiments, the end of the first support arm 120a or the end of the second support arm 120b may have a perimeter equal to or narrower than the aperture of the base plate 110. In some embodiments, the ends of the first support arm 120a and the second support arm 120b are wider than the aperture.

First support arm 120a and second support arm 120b are coupled to the base plate 110. In at least one embodiment, first support arm 120a and second support arm 120b are welded to the base plate 110. In other embodiments, first support arm 120a and second support arm 120b couple to the base plate 110 through a mounting fixture, such as a screw, bolt, or nail.

First support arm 120a and second support arm 120b are coupled to a bottom housing platform 130. In at least one embodiment, first support arm 120a and second support arm 120b are welded to bottom housing platform 130. In at least one embodiment, first support arm 120a and second support arm 120b can be welded to bottom housing platform 130. In other embodiments, first support arm 120a and second support arm 120b couple to the bottom housing platform 130 through a mounting fixture, such as a screw, bolt, or nail. First support arm 120a and second support arm 120b may be attached to the center of the base plate 110. In other embodiments, first support arm 120a and second support arm 120b are attached to the base plate 110 at a position other than the center. In some embodiments, first support arm 120a and second support arm 120b are horizontally staggered. In some embodiments, first support arm 120a and second support arm 120b are vertically staggered. The horizontal and vertical stagger between the first support arm 120a and second support arm 120b may provide angular support for LiDAR mirror assembly 100.

First support arm 120a and second support arm 120b may be made from a metal, such as an aluminum or an aluminum alloy. First support arm 120a and second support arm 120b may also be made from plastic or any other material with qualities such as high strength, high resistance to corrosion, and light weight.

Bottom housing platform 130 is coupled to first support arm 120a and second support arm 120b. Bottom housing platform 130 has a top surface and a bottom surface. Bottom housing platform 130 is coupled to the first support arm 120a and the second support arm 120b at the bottom surface of bottom housing platform 130. In some embodiments, bottom housing platform 130 has a housing platform aperture. The housing platform aperture passes through the bottom surface to the top surface. The housing platform aperture is configured to receive either the first support arm 120a or the second support arm 120b. Additional housing platform apertures may be configured to receive both first support arm 120a or the second support arm 120b. In some embodiments, the additional housing platform aperture is located on the bottom surface of bottom housing platform 130 but does not pass through to the top surface of bottom housing platform 130.

Bottom housing platform 130 may be substantially planar on both the bottom surface and the top surface. In some embodiments, bottom housing platform 130 may be sloped. Bottom housing platform 130 may have a rectangular shape or any other polygon shape. Bottom housing platform 130 may have a shape that matches the shape of top housing enclosure 160. The bottom housing platform 130 may have right angles on one end of the bottom housing platform 130 and has rounded semi-circular shape on the opposite end of the bottom housing platform 130. Bottom housing platform 130 may be solid or hollow.

The housing platform aperture may be circular or a polygon. In a circular configuration, the housing platform aperture may have a diameter equal to or wider than the end of the first support arm 120a or the end of second support arm 120b. In a polygon configuration, the housing platform aperture may have a perimeter equal to or wider than the end of the first support arm 120a or the end of the second support arm 120b. In some embodiments, the ends of the first support arm 120a and the second support arm 120b are wider than the housing platform aperture.

Bottom housing platform 130 is coupled to the first support arm 120a and the second support arm 120b at the bottom surface of bottom housing platform 130. In some embodiments, first support arm 120a and second support arm 120b are attached to the bottom surface of the bottom housing platform 130 at the location of the housing platform aperture. First support arm 120a and second support arm 120b may connect to the bottom surface of bottom housing platform 130 around the housing platform aperture. In other embodiments, the first support arm 120a or the second support arm may partially pass through the housing platform aperture. In some embodiments, either the first end or the second end of the first support arm 120a or the second support arm 120b is flush with the top surface of the bottom housing platform 130. Both the first support arm 120a and the second support arm 120b may be connected to additional housing platform apertures. The end of the first support arm 120a or the end of the second support arm 120b may have a diameter equal to or narrower than the end of the housing platform aperture. In some embodiments, the end of the first support arm 120a or the end of the second support arm 120b may have a perimeter equal to or narrower than the housing platform aperture. In some embodiments, the ends of the first support arm 120a and the second support arm 120b are wider than the housing platform aperture.

Bottom housing platform 130 may be welded to first support arm 120a and second support arm 120b. In at least one embodiment, the first support arm 120a or second support arm 120b is welded to the bottom housing platform 130 at the housing platform aperture. In other embodiments, first support arm 120a and second support arm 120b couple to the bottom housing platform 130 through a mounting fixture, such as a screw, bolt, or nail.

Bottom housing platform 130 may be made from a metal, such as an aluminum or an aluminum alloy. Bottom housing platform 130 may also be made from a plastic or any other material with qualities such as high strength, high resistance to corrosion, and light weight.

Wires may pass through the housing platform aperture to the open ends of the first support arm 120a and second support arm 120b, allowing the LiDAR mirror assembly 100 to be communicatively coupled and powered to the electronics of the vehicle.

Bottom housing platform 130 is located below be coupled to the top housing enclosure 160. For example, the bottom housing platform 130 may be coupled to the top housing enclosure 160 via screw holes on the first bottom housing enclosure 134a and the second bottom housing enclosure 134b and the corresponding screw housing in the top housing enclosure 160.

Optionally, first bottom housing enclosure 134a and second bottom housing enclosure 134b cover the bottom surface and the side surface of bottom housing platform 130. The bottom housing platform 130, the first bottom housing enclosure 134a, and second bottom housing enclosure 134b can be considered a bottom housing assembly. First bottom housing enclosure 134a and second bottom housing enclosure 134b include openings to allow first support arm 120a and second support arm 120b to pass through the first bottom housing enclosure 134a and second bottom housing enclosure 134b to the bottom housing platform 130. First bottom housing enclosure 134a and second bottom housing enclosure 134b are configured to couple together, covering the bottom surface of the bottom housing platform 130. First bottom housing enclosure 134a and second bottom housing enclosure 134b can couple together using a screw, a bolt, a velcro, a glue, a tab and insert, a hook-and-loop device, or a tape. First bottom housing enclosure 134a and second bottom housing enclosure 134b may also cover the side surface of bottom housing platform 130. In some embodiments, first bottom housing enclosure 134a and second bottom housing enclosure 134b are made from a metal, such as aluminum or an aluminum alloy. First bottom housing enclosure 134a and second bottom housing enclosure 134b may also be made from plastic or any other material with qualities such as high strength, high resistance to corrosion, and light weight.

First bottom housing enclosure 134a and second bottom housing enclosure 134b may be coupled to top housing enclosure 160. Thus, the top housing enclosure 160 may be coupled to the bottom housing platform 130 via the first bottom housing enclosure 134a and second bottom housing enclosure 134b. In some embodiments, the top housing enclosure 160 may be coupled directly to the bottom housing platform 130. The sides of the first bottom housing enclosure 134a and the second bottom housing enclosure 134b may be flush with the sides of top housing enclosure 160. First bottom housing enclosure 134a and second bottom housing enclosure 134b may have the same shape as top housing enclosure 160. First bottom housing enclosure 134a and second bottom housing enclosure 134b may have the same shape as bottom housing platform 130. First bottom housing enclosure 134a and second bottom housing enclosure 134b may have the same shape as bottom housing platform 130. First bottom housing enclosure 134a and second bottom housing enclosure 134b may form the bottom portion of top housing enclosure 160. In some embodiments, the bottom housing platform 130, the first bottom housing enclosure 134a, and second bottom housing enclosure 134b may be a single structure.

Mirror 140 is coupled to the bottom housing platform 130 via the mirror bracket 132. The integration of the mirror 140 on the LiDAR mirror assembly is an advantageous feature at least because the mirror 140 can replace the vehicle's stock mirror with similar dimension or location on the vehicle. As shown in FIGS. 8 and 9, the LiDAR mirror assembly is mounted on a hood of the vehicle so that the mirror 140 is on the side that faces the driver or the vehicle's cab so that a driver can see an image of an area reflected by the mirror 140. In FIG. 1, the mirror 140 is located on a side surface of the housing. For example, the mirror 140 is located adjacent to a side surface of the top housing enclosure 160 and the second bottom housing enclosure 134b or the bottom housing platform 130. Mirror 140 may be coupled to the bottom housing platform 130 at a location distal to the base plate 110 and away from the opening in the housing that includes the sensor 150. The shape of mirror 140 may be rectangular with rounded edges. Mirror 140 includes a reflective side and a mounting side. In some embodiments, the reflective side is flat. In other embodiments, the reflective side is slightly convex. The mounting side includes a mounting fixture, such as a screw, a bolt, a velcro, a glue, a tab and insert, a ball and joint, a ball swivel, a hook-and-loop device, or a tape. The ball swivel mounting fixture 142 allows the mirror 140 to pivot in different directions, adjusting an angle and direction of reflection so that the mirror can be adjusted to reflect images from an area desired by a driver. The pivot of ball swivel mounting fixture 142 may be adjusted by applying pressure to the edge of the mirror 140.

The mounting fixture or the ball swivel mounting fixture 142 may attach to the platform via the mirror bracket 132. Bottom housing platform 130 may include a mirror bracket 132. Mirror bracket 132 extends from the top surface of bottom housing platform 130. In some embodiments, mirror bracket 132 extends vertically from the top surface of bottom housing platform 130. In some embodiments, mirror bracket 132 may be vertically aligned with an edge of bottom housing platform 130. In some embodiments, mirror bracket 132 may be perpendicular to bottom housing platform 130.

The mirror 140 may be attached to the mirror bracket 132. Mirror bracket 132 may have one side that is substantially planar. The substantially planar side may face the mounting side of the mirror 140. The substantially planar side may include a hole. In at least one embodiment, ball swivel mounting fixture 142 attaches to mirror bracket 132 via the hole of the substantially planar side. In other embodiments, a mounting fixture of mirror 140 attaches to mirror bracket 132 through the hole of the substantially planar side.

Mirror bracket 132 may be welded to bottom housing platform 130. Mirror bracket 132 may have side supports. The side supports of mirror bracket 132 may be welded to bottom housing platform 130. In other embodiments, mirror bracket 132 couples to the bottom housing platform 130 through a mounting fixture, such as a screw, a bolt, a velcro, a glue, a tab and insert, a hook-and-loop device, or a tape.

Mirror bracket 132 may be made from a metal, such as an aluminum or an aluminum alloy. Mirror bracket 132 may also be made from a plastic or any other material with qualities such as high strength, high resistance to corrosion, and light weight.

Bottom housing platform 130 supports the sensor 150. Bottom housing platform 130 may include a hole in the top surface of bottom housing platform 130. The sensor 150 may be coupled to the top surface of the bottom housing platform 130 using the hole in the bottom housing platform 130 and a mounting fixture. This mounting fixture may include a nail, a screw, or a bolt. Sensor 150 may also mount to bottom housing platform 130 via another mounting fixture such as an adhesive, velcro, a glue, a tab and insert, a hook-and-loop device, or a tape.

Top housing enclosure 160 include an opening located at a distal end of the housing away from the base plate 110 so that a sensor 150 can be located within the opening of the housing and so that the opening exposes at least some portion of the sensor to the environment. The opening in the top housing enclosure 160 extends from a front side of the top housing enclosure 160 to the back side of the top housing enclosure 160. In some embodiments, the front side of top housing enclosure 160 faces toward the vehicle cabin and the back side of top housing enclosure 160 faces in the opposite direction.

The sensor 150 is coupled to the bottom platform at a location where at least some surface of the sensor 150 exposed through the opening. The at least some surface of the sensor 150 is exposed to the environment via the opening so that sensor can transmit light pulses and measure reflected light that bounces off of one or more objects in an environment where the vehicle is being driven. The at least some exposed surface of the sensor is recessed from an edge of the top housing enclosure 160 and the bottom housing platform 130 at a distal end relative to the base plate 110. The opening of the top housing enclosure allows the sensor to scan its environment (e.g., a terrain or road) and/or collect data from measurements obtained from the environment.

Sensor 150 may be a light detection and ranging (LiDAR) sensor. A light detection and ranging (LiDAR) sensor measures distance by illuminating a target with a laser light. The laser light is reflected back to the LiDAR, providing critical information about potential obstacles and the surrounding environment of the autonomous vehicle. The LiDAR rapidly scans across the environment of the autonomous vehicle to provide continuous real time information on distances.

Sensor 150 may be a mechanical LiDAR sensor. Additionally, sensor 150 may be a radar unit, a camera unit, an ultrasonic sensor, a communication unit, or another sensing unit used in autonomous vehicles.

Sensor 150 may include sensor wire 152. Sensor wire 152 may communicatively couple the sensor 150 to the vehicle. Sensor wire 152 may power the sensor 150. Sensor wire 152 may extend from the sensor 150 to the platform aperture. Sensor wire 152 may extend down the platform aperture, passing through the first support arm 120a or the second support arm 120b and the base plate 110.

The bottom housing platform 130 may be coupled to top housing enclosure 160. Top housing enclosure 160 includes a gap for mirror 140 and an opening for sensor 150. The opening for sensor 150 is situated near an end of the top housing enclosure 160 farthest away from the base plate 110. The opening for sensor 150 is further away from the vehicle to maximize the vantage point of the LiDAR mirror assembly 100. The opening may extend from the bottom of the bottom housing platform 130 to the top of the top housing enclosure 160. In some embodiments, the opening extends from the bottom of the bottom housing platform 130 to a height lower than the top of the top housing enclosure 160.

The mirror 140 may be situated on the front side of the top housing enclosure 160. The height of the front side of the top housing enclosure 160 may be greater than the height of the mirror 140. The gap for mirror 140 is situated on the front side of top housing enclosure 160. The shape of the gap for mirror 140 may match the shape of the mirror 140. Mirror bracket 132 may be closer to the front side of the top housing enclosure 160 than the back side of the top housing enclosure 160.

The front side may cover a first portion of the opening and the back side may cover a second portion of the opening. Accordingly, the opening may be viewed from both the front side of the top housing enclosure 160 and the back side of the top housing enclosure 160. In some embodiments, the opening for sensor 150 is farther away from the base plate 110 than the mirror 140.

Top housing enclosure 160 may be flat at the end closest to or proximal to the base plate 110 and may have a rounded semi-circular shape at the end of the housing farthest away or distal from the base plate 110. The rounded end farthest away from the base plate 110 allows the opening to be seen from both the front side of the top housing enclosure 160 and back side of the top housing enclosure 160. The rounded end farthest away from the base plate 110 defines the contour of the opening.

Top housing enclosure 160 may be coupled to bottom housing platform 130. In some embodiments, top housing enclosure may be coupled to first bottom housing enclosures 134a or second bottom housing enclosure 134b. Top housing enclosure 160 may include holes that pass through a portion of top housing enclosure 160. The holes may be used for a mounting fixture to attach to the bottom housing platform 130 or the first bottom housing enclosure 134a or the second bottom housing enclosure 134b. Mounting fixtures may include a screw, a bolt, a nail, an adhesive, a velcro, a glue, a hook-and-loop device, a tab and insert, a hook, or a tape.

Top housing enclosure 160 may be made from a metal, such as aluminum or an aluminum alloy. Top housing enclosure 160 may also be made from plastic or any other material with qualities such as high strength, high resistance to corrosion, and light weight.

Top housing enclosure 160 includes a cutout 162 or hole on a back side of the top housing enclosure 160, where the cutout 162 extends laterally and at least partially includes an LED 164. Additionally, LED 164 may be coupled to the bottom housing platform 130 or first bottom housing enclosure 134a or second bottom housing enclosure 134b. LED 164 may be the shape of a strip that also extends laterally and is at least partially located in the cutout 162 in the top housing enclosure 160. LED 164 may be placed on the back side of top housing enclosure 160 and opposite to the front side of the housing that includes the mirror 140. The LED 164 may be outside the view of the vehicle cabin. LED 164 includes an LED wire 164. LED wire 164 may extend from LED to the housing platform aperture, passing through the first support arm 150a or the second support arm 150b and the base plate 110.

Figure 5:
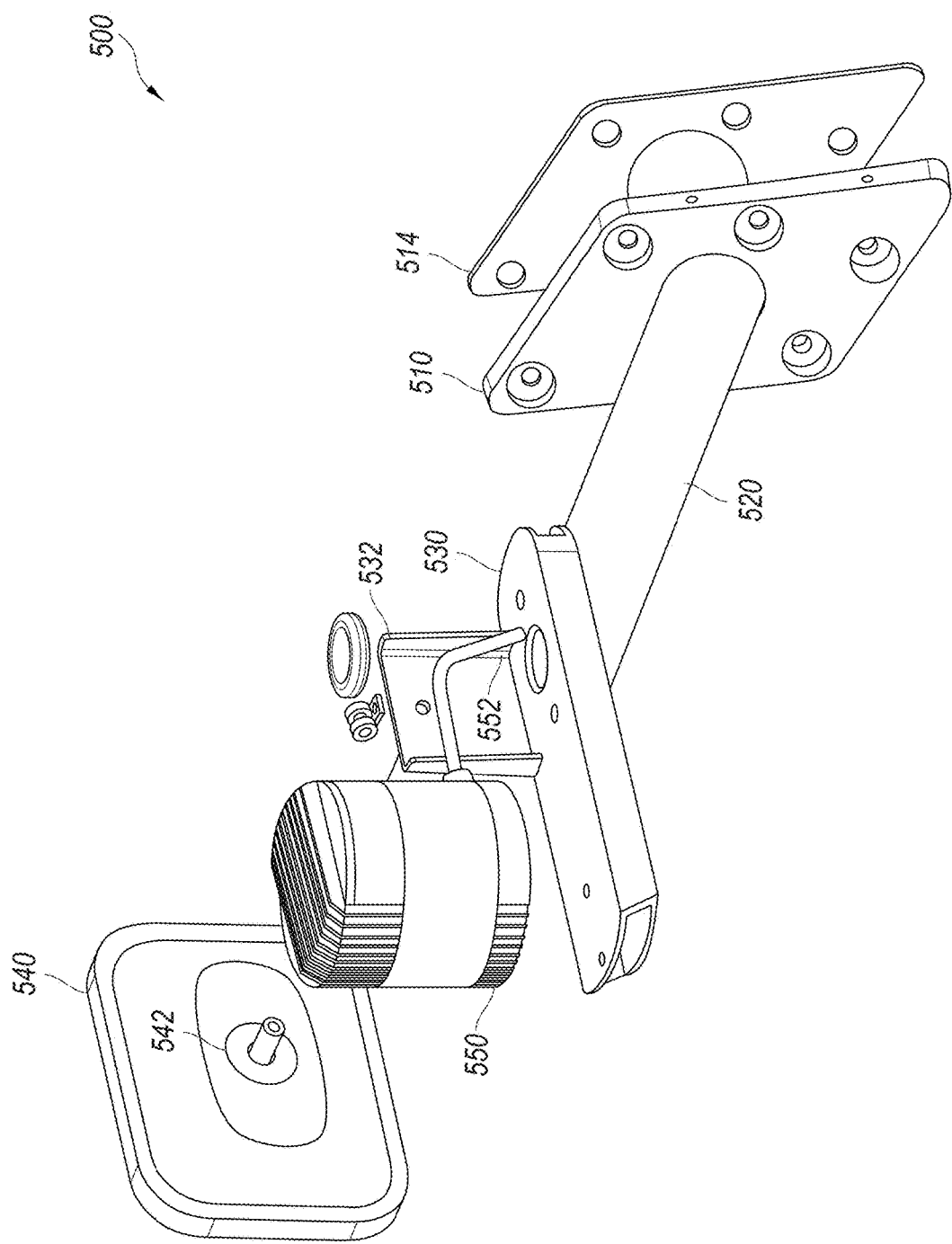
FIG. 5 shows an exploded partial view of a second exemplary LiDAR mirror with one support arm from a back side of the exemplary LiDAR mirror assembly.

FIG. 5 shows an exploded partial view of a second exemplary LiDAR mirror assembly with one support arm from a back side of the exemplary LiDAR mirror. The single-support LiDAR mirror 500 includes a base plate 510 that is coupled to a single support arm 520. Compared to the support arms 120a, 120b of the first exemplary embodiment, the support arm 520 has a diameter that is greater than the diameter of each of the support arms 120a, 120b so that the support arm 520 can provide a stable or relatively stable bottom housing platform 530. Support arm 520 is coupled to a bottom housing platform 530. The bottom housing platform 530 is coupled to a mirror bracket 532. The mirror bracket 532 is coupled to mirror 540 via ball swivel mounting fixture 542. The bottom housing platform 530 supports a sensor 550. The bottom housing platform 530 support mirror 540 via the mirror bracket 532. Sensor 550 includes sensor wire 552. Optionally, gasket 514 is coupled to base plate 510. Single-support LiDAR mirror 500 may be coupled to a vehicle.

Base plate 510 is substantially planar. In at least one embodiment, base plate 510 is vertically oriented. Base plate 510 may be installed to the outer portion of the vehicle. Base plate 510 may be convex or concave to match the contour of a vehicle. Base plate 510 may have a rectangular shape or any other polygon shape. Base plate 510 may have a circular or oval shape. Base plate 510 may have beveled edges. Base plate 510 may have square corners or rounded corners. Base plate 510 may be configured to couple to the outer portion of the vehicle with a mounting fixture such as a screw, a bolt, a velcro, a glue, a tab and insert, a hook-and-loop device, an adhesive, or a tape.

Base plate 510 has an outer surface and an inner surface. The outer surface of base plate 110 may be substantially flat. The inner surface of base plate 510 may be substantially flat. The outer surface of base plate 510 may be flat while the inner surface of the base plate 510 is convex or concave. Alternatively, the inner surface of base plate 510 may be flat while the outer surface is convex or concave.

In some embodiments, base plate 510 includes at least one aperture. The aperture is configured to receive either the support arm 520. Multiple apertures may be configured to receive the support arm 520. The aperture may be circular or a polygon. In a circular configuration, the aperture may have a diameter equal to or wider than the end of the support arm 520. In a polygon configuration, the aperture may have a perimeter equal to or wider than the end of the support arm 520. In at least one embodiment, the support arm 520 is attached to the base plate 510 at the aperture. In some embodiments, the ends of the support arm 520 is narrower than the aperture.

Base plate 510 may include holes that pass through the entire base plate 510. The holes may be used for a mounting fixture. Mounting fixtures may include a screw, a bolt, a nail, an adhesive, a velcro, a glue, a hook-and-loop device, a tab and insert, a hook, or a tape. Base plate 510 may include holes located in the center of the base plate 510. The holes may be off-centered. In at least one embodiment, the holes are located near an outer-right section of the base plate 510. In some embodiments, the holes may be arranged around the at least one aperture.

Base plate 510 may be made from a metal, such as aluminum or an aluminum alloy. Base plate 510 may also be made from plastic or any other material with qualities such as high strength, high resistance to corrosion, and light weight.

Optionally, gasket 514 is coupled to base plate 510. One side of gasket 514 is flush with base plate 510. The opposite side of gasket 514 may be flush with the vehicle's hood or the interior plate 516. Gasket 514 may be made from a rubber material to provide a seal and uniform contact with the body of the vehicle and base plate 510.

In some embodiments, gasket 514 has the same shape and size as base plate 510. In other embodiments, gasket 514 is larger or smaller than base plate 510. In some embodiments, gasket 514 has holes and apertures aligned with the holes and apertures of base plate 510. Gasket 514 may include holes corresponding to the aperture of the base plate 510. In some embodiments, the hole corresponding to the aperture of the base plate 510 in gasket 514 allows wires to pass from the base plate 510 to the interior of the vehicle. In some embodiments, holes in the gasket 514 correspond to the holes that pass through the entire base plate 510. These holes in the gasket allow the mounting fixtures of base plate 510, such as a screw, bolt, or nail, to pass through gasket 514. In some embodiments, the pressure applied to the gasket 514 couples the gasket 514 to the base plate 510.

Base plate 510 is coupled to the support arm 520. The support arm 520 extends from the base plate 510 to the bottom housing platform 530. Support arm 520 extends in a direction away from base plate 510. In some embodiments, support arm 520 extends in a diagonal direction away from base plate 510. In some embodiments, support arm 520 is perpendicular to the base plate 510.

Support arm 520 is elongated in one direction. In some embodiments, support arm 520 has the shape of a tube or pipe. The support arm 520 may be hollow. The support arm 520 may have a cylindrical shape or a polygonal shape. In some embodiments, the shape of the support arm 520 matches the shape of the aperture of base plate 510. The support arm 520 has a first end and a second end. In some embodiments, the first end of the support arm 520 is open and the second end of the support arm 520 is open. Wires may pass through the open ends of the support arm 520, allowing the single-support LiDAR mirror 500 to be communicatively coupled and powered to the electronics of the vehicle. In at least one embodiment, a first end of either the support arm 520 is attached to the base plate 510. In at least one embodiment, a second end of either the support arm 520 is attached to the housing, such as the bottom housing platform 530.

Support arm 520 is attached to an outer surface of the base plate 510. Base plate 510 may include at least one aperture. In some embodiments, support arm 520 is attached to an outer surface of the base plate 510 at the location of the aperture on base plate 510. Support arm 520 may connect to the outer surface of the base plate 510 around the aperture of the base plate 510. In other embodiments, the support arm 520 may partially pass through the aperture of the base plate 510. In some embodiments, either the first end or the second end of the support arm 520 is flush with the inner surface of the base plate 510. The support arm 520 may be connected to multiple apertures of base plate 510. The end of the support arm 520 may have a diameter equal to or narrower than the end of the aperture of the base plate 510. In some embodiments, the end of the support arm 520 may have a perimeter equal to or narrower than the aperture of the base plate 510. In some embodiments, the ends of the support arm 520 are wider than the aperture.

Support arm 520 is coupled to the base plate 510. In at least one embodiment, support arm 520 is welded to the base plate 510. In other embodiments, support arm 520 couples to the base plate 510 through a mounting fixture, such as a screw, bolt, or nail.

Support arm 520 is coupled to a bottom housing platform 530. In at least one embodiment, support arm 520 is welded to bottom housing platform 530. In other embodiments, support arm 520 couples to the bottom housing platform 530 through a mounting fixture, such as a screw, bolt, or nail. Support arm 520 may be attached to the center of the base plate 510. In other embodiments, support arm 520 is attached to the base plate 510 at a position other than the center.

Support arm 520 may be made from a metal, such as an aluminum or an aluminum alloy. Support arm 520 may also be made from plastic or any other material with qualities such as high strength, high resistance to corrosion, and light weight.

Bottom housing platform 530 is coupled to support arm 520. Bottom housing platform 530 has a top surface and a bottom surface. Bottom housing platform 530 is coupled to the support arm 520 at the bottom surface of bottom housing platform 530. In some embodiments, bottom housing platform 530 has a housing platform aperture. The housing platform aperture passes through the bottom surface to the top surface. The housing platform aperture is configured to receive the support arm 520. Additional housing platform apertures may be configured to receive the support arm 520. In some embodiments, the additional housing platform aperture is located on the bottom surface of bottom housing platform 530 but does not pass through to the top surface of bottom housing platform 530.

Bottom housing platform 530 may be substantially planar on both the bottom surface and the top surface. In some embodiments, bottom housing platform 530 may be sloped. Bottom housing platform 530 may have a rectangular shape or any other polygon shape. Bottom housing platform 530 may have a shape that matches the shape of top housing enclosure 560. Platform may have right angles on one end of the bottom housing platform 530 and has rounded circles on the opposite end. Bottom housing platform 530 may be solid or hollow. Bottom housing platform 530 may have square corners or rounded corners.

The housing platform aperture may be circular or a polygon. In a circular configuration, the housing platform aperture may have a diameter equal to or wider than the end of the support arm 520. In a polygon configuration, the housing platform aperture may have a perimeter equal to or wider than the end of the support arm 520. In some embodiments, the ends of the support arm 520 is wider than the housing platform aperture.

Bottom housing platform 530 is coupled to the support arm 520 at the bottom surface of bottom housing platform 530. In some embodiments, support arm 520 is attached to the bottom surface of the bottom housing platform 530 at the location of the housing platform aperture. Support arm 520 may connect to the bottom surface of bottom housing platform 530 around the housing platform aperture. In other embodiments, the support arm 520 may partially pass through the housing platform aperture. In some embodiments, either the first end or the second end of the support arm 520 is flush with the top surface of the bottom housing platform 530. The support arm 520 may be connected to additional housing platform apertures. The end of the support arm 520 may have a diameter equal to or narrower than the end of the housing platform aperture. In some embodiments, the end of the support arm 520 may have a perimeter equal to or narrower than the housing platform aperture. In some embodiments, the ends of the support arm 520 are wider than the housing platform aperture.

Bottom housing platform 530 may be welded to support arm 520. In at least one embodiment, the support arm 520 is welded to the bottom housing platform 530 at the housing platform aperture. In other embodiments, support arm 520 couples to the bottom housing platform 530 through a mounting fixture, such as a screw, bolt, or nail.

Bottom housing platform 530 may be made from a metal, such as an aluminum or an aluminum alloy. Bottom housing platform 530 may also be made from a plastic or any other material with qualities such as high strength, high resistance to corrosion, and light weight.

Wires may pass through the housing platform aperture to the open ends of the support arm 520, allowing the LiDAR mirror 500 to be communicatively coupled and powered to the electronics of the vehicle.

Bottom housing platform 530 may form the bottom portion of top housing enclosure 560.

Mirror 540 is mounted on to bottom housing platform 530. Bottom housing platform 530 is configured to support mirror 540. Mirror 540 may also be attached to top housing enclosure 560. The shape of mirror 540 may be rectangular with rounded edges. Mirror 540 includes a reflective side and a mounting side. In some embodiments, the reflective side is flat. In other embodiments, the reflective side is slightly convex. The mounting side includes a mounting fixture, such as a screw, a bolt, a velcro, a glue, a tab and insert, a ball and joint, a ball swivel, a hook-and-loop device, or a tape. The ball swivel mounting fixture 542 allows the mirror 540 to pivot in different directions, adjusting an angle and direction of reflection. The pivot of ball swivel mounting fixture 542 may be adjusted by applying pressure to the edge of the mirror 540.

The mounting fixture or the ball swivel mounting fixture 542 may attach to the platform via the mirror bracket 532. Bottom housing platform 530 may include a mirror bracket 532. Mirror bracket 532 extends from the top surface of bottom housing platform 530. In some embodiments, mirror bracket 532 extends vertically from the top surface of bottom housing platform 530. In some embodiments, mirror bracket 532 may be vertically aligned with an edge of bottom housing platform 530. In some embodiments, mirror bracket 532 may be perpendicular to bottom housing platform 530.

The mirror 540 may be attached to the mirror bracket 532. Mirror bracket 532 may have one side that is substantially planar. The substantially planar side may face the mounting side of the mirror 540. The substantially planar side may include a hole. In at least one embodiment, ball swivel mounting fixture 542 attaches to mirror bracket 532 via the hole of the substantially planar side. In other embodiments, a mounting fixture of mirror 540 attaches to mirror bracket 532 through the hole of the substantially planar side.

Mirror bracket 532 may be welded to bottom housing platform 530. Mirror bracket 532 may have side supports. The side supports of mirror bracket 532 may be welded to bottom housing platform 530. In other embodiments, mirror bracket 532 couples to the bottom housing platform 530 through a mounting fixture, such as a screw, a bolt, a velcro, a glue, a tab and insert, a hook-and-loop device, or a tape.

Mirror bracket 532 may be made from a metal, such as an aluminum or an aluminum alloy. Mirror bracket 532 may also be made from a plastic or any other material with qualities such as high strength, high resistance to corrosion, and light weight.

Bottom housing platform 530 supports the sensor 550. Bottom housing platform 530 may include a hole in the top surface of bottom housing platform 530. The sensor 550 may be coupled to the top of the bottom housing platform 530 using the hole and a mounting fixture. This mounting fixture may include a nail, a screw, or a bolt. Sensor 550 may also mount to bottom housing platform 530 via another mounting fixture such as an adhesive, velcro, a glue, a tab and insert, a hook-and-loop device, or a tape.

Sensor 550 may be a light detection and ranging (LiDAR) sensor. A light detection and ranging (LiDAR) sensor measures distance by illuminating a target with a laser light. The laser light is reflected back to the LiDAR, providing critical information about potential obstacles and the surrounding environment of the autonomous vehicle. The LiDAR rapidly scans across the environment of the autonomous vehicle to provide continuous real time information on distances.

Sensor 550 may be a mechanical LiDAR sensor. Additionally, sensor 550 may be a radar unit, a camera unit, an ultrasonic sensor, a communication unit, or another sensing unit used in autonomous vehicles.

Sensor 550 may include sensor wire 552. Sensor wire 552 may communicatively couple the sensor 550 to the vehicle. Sensor wire 552 may power the sensor 550. Sensor wire 552 may extend from the sensor 550 to the platform aperture. Sensor wire 552 may extend down the platform aperture, passing through the hollow support arm and the aperture in the base plate 510.

Figure 6:
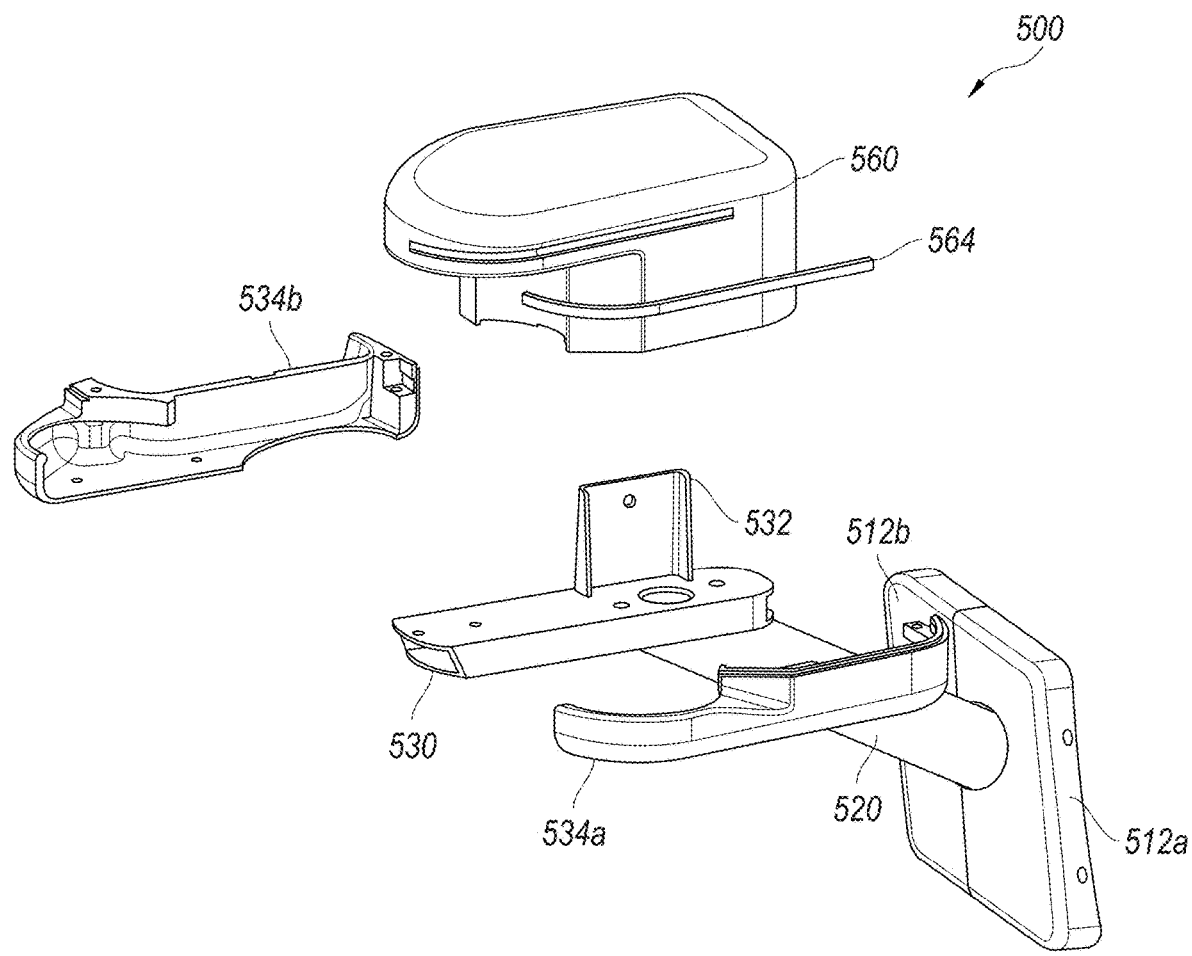
FIG. 6 shows another exploded view of a back side of the second exemplary LiDAR mirror assembly with one support arm.
Figure 7:
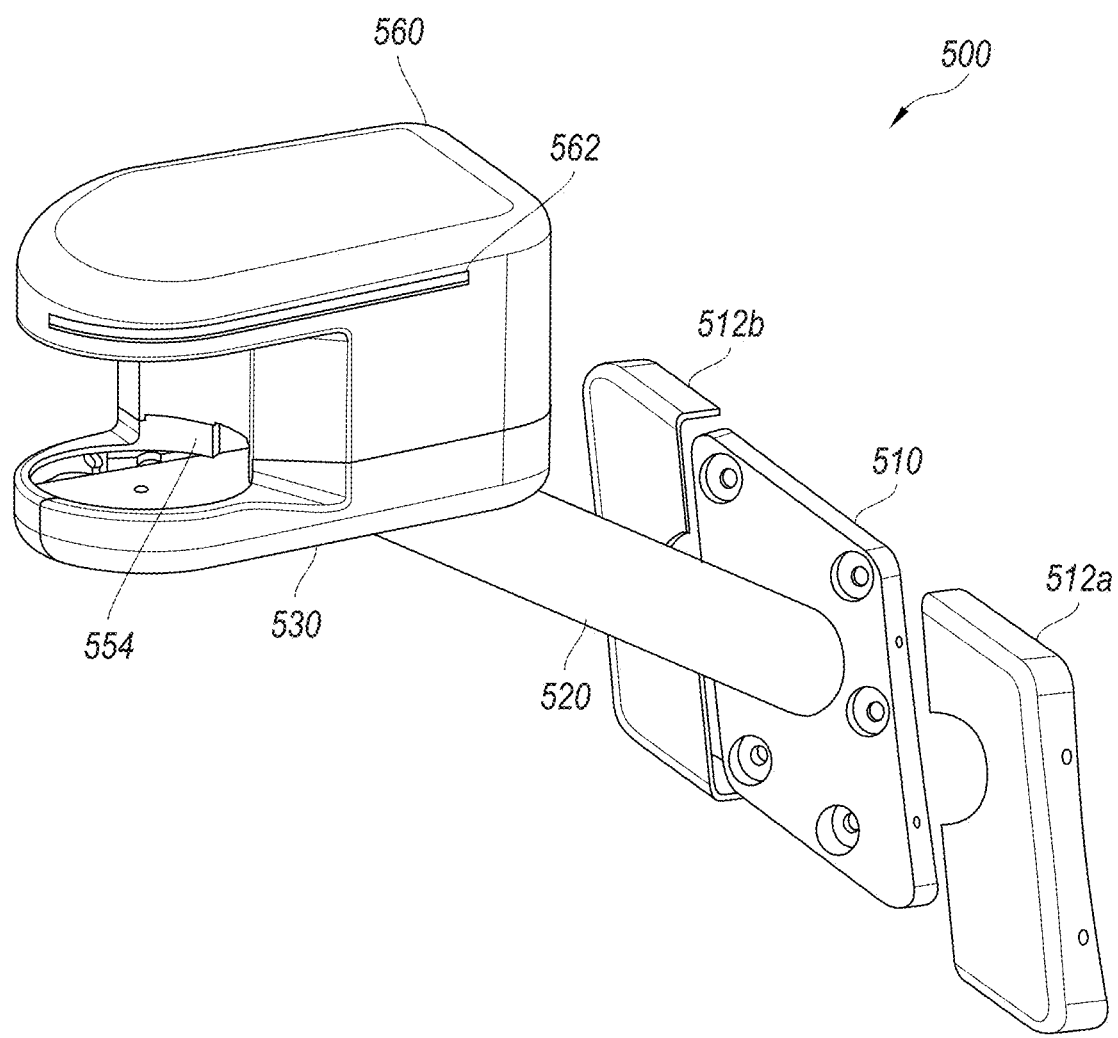
FIG. 7 shows an assembled view of a back side of the second exemplary LiDAR mirror assembly with one support arm.

FIGS. 6 and 7 respectively show another exploded view and assembled view of a back side of an exemplary LiDAR mirror with one support arm. The top housing enclosure 560 may be coupled to the bottom housing platform 530 via the first bottom housing enclosure 534a and second bottom housing enclosure 534b. The top housing enclosure 560, first bottom housing enclosure 534a, and second bottom housing enclosure 534b include an opening 554 in which a sensor is located. The top housing enclosure 560 includes a cutout through which an LED 562 is inserted. LED 562 may include an LED wire 564. The opening 554 is located at a distal end of the top housing enclosure 560 and the bottom housing platform 530 or farthest away from the base plate 510. Optionally, first base plate enclosure 512a and second base plate enclosure 512b cover base plate 510.

Optionally, first base plate enclosure 512a and second base plate enclosure 512b cover base plate 510. First base plate enclosure 512a and second base plate enclosure 512b include openings to allow the support arm 520 to pass through first base plate enclosure 512a and second base plate enclosure 512b to the base plate 510. First base plate enclosure 512a and second base plate enclosure 512b are configured to couple together, covering the base plate 510. First base plate enclosure 512a and second base plate enclosure 512b can couple together using a screw, a bolt, a velcro, a glue, a tab and insert, a hook-and-loop device, an adhesive, or a tape. First base plate enclosure 512a and second base plate enclosure 512b may cover the side surface of base plate 510. In some embodiments, first base plate enclosure 512a and second base plate enclosure 512b are made from a metal, such as an aluminum or an aluminum alloy. First base plate enclosure 512a and second base plate enclosure 512b may also be made from plastic or any other material with qualities such as high strength, high resistance to corrosion, and light weight.

Optionally, first bottom housing enclosure 534a and second bottom housing enclosure 534b cover the bottom surface and the side surface of bottom housing platform 530. First bottom housing enclosure 534a and second bottom housing enclosure 534b include openings to allow support arm 520 to pass through the first bottom housing enclosure 534a and second bottom housing enclosure 534b to the bottom housing platform 530. First bottom housing enclosure 534a and second bottom housing enclosure 534b are configured to couple together, covering the bottom surface of the bottom housing platform 530. First bottom housing enclosure 534a and second bottom housing enclosure 534b can couple together using a screw, a bolt, a velcro, a glue, a tab and insert, a hook-and-loop device, or a tape. First bottom housing enclosure 534a and second bottom housing enclosure 534b may also cover the side surface of bottom housing platform 530. In some embodiments, first bottom housing enclosure 534a and second bottom housing enclosure 534b are made from a metal, such as aluminum or an aluminum alloy. First bottom housing enclosure 534a and second bottom housing enclosure 534b may also be made from plastic or any other material with qualities such as high strength, high resistance to corrosion, and light weight. First bottom housing enclosure 534a and second bottom housing enclosure 534b may be coupled to the top housing enclosure 560. The sides of the first bottom housing enclosure 534a and the second bottom housing enclosure 534b may be flush with the sides of top housing enclosure 560. First bottom housing enclosure 534a and second bottom housing enclosure 534b may have the same shape as top housing enclosure 560. First bottom housing enclosure 534a and second bottom housing enclosure 534b may form the bottom portion to which the top housing enclosure 560 can be coupled.

The bottom housing platform 530 may be coupled to top housing enclosure 560. Top housing enclosure 560 includes a gap for mirror 140 and an opening for sensor 550. The opening for sensor 550 is situated near an end of the top housing enclosure 560 farthest away from the base plate 510. The opening for sensor 550 is further away from the vehicle to maximize the vantage point of the single-support LiDAR mirror 500. The opening may extend from the bottom of the bottom housing platform 530 to the top of the top housing enclosure 560. In some embodiments, the opening extends from the bottom of the bottom housing platform 530 to a height lower than the top of the top housing enclosure 560.

Top housing enclosure 560 includes a front side and a back side. Generally, the front side of top housing enclosure 560 faces toward the vehicle cabin and the back side of top housing enclosure 560 faces in the opposite direction. The mirror 540 may be situated on the front side of the top housing enclosure 560. The height of the front side of the top housing enclosure 560 may be greater than the height of the mirror 540. The gap for mirror 540 is situated on the front side of top housing enclosure 560. The shape of the gap for mirror 540 matches the shape of the mirror 540. Mirror bracket 532 may be closer to the front side of the top housing enclosure 560 than the back side of the top housing enclosure 560. In some embodiments, the height of the front side of the housing is greater than the height of the back side of the housing.

The front side may cover a first portion of the opening and the back side may cover a second portion of the opening. Accordingly, the opening may be viewed from both the front side of the top housing enclosure 560 and the back side of the top housing enclosure 560. In some embodiments, the opening for sensor 550 is farther away from the base plate 510 than the mirror 540.

Top housing enclosure 560 may be flat at the end closest to or proximal to the base plate 510 and rounded at the end of the housing farthest away from the base plate 510. The distal end of the top housing enclosure 560 relative to the base plate can have a semi-circular shape. The rounded end farthest away from the base plate 510 allows the opening to be seen from both the front side of the top housing enclosure 560 and back side of the top housing enclosure 560. The rounded end farthest away from the base plate 510 defines the contour of the opening.

Top housing enclosure 560 may be coupled to bottom housing platform 530. In some embodiments, top housing enclosure 560 may be coupled to first bottom housing enclosures 534a or second bottom housing enclosure 534b. Top housing enclosure 560 may include holes that pass through a portion of top housing enclosure 560. The holes may be used for a mounting fixture to attach to the bottom housing platform 530 or the first bottom housing enclosure 534a or the second bottom housing enclosure 534b. Mounting fixtures may include a screw, a bolt, a nail, an adhesive, a velcro, a glue, a hook-and-loop device, a tab and insert, a hook, or a tape.

Top housing enclosure 560 may be made from a metal, such as aluminum or an aluminum alloy. Top housing enclosure 560 may also be made from plastic or any other material with qualities such as high strength, high resistance to corrosion, and light weight.

Top housing enclosure 560 includes LED 562. Additionally, LED 562 may be coupled to the bottom housing platform 530 or first bottom housing enclosure 534a or second bottom housing enclosure 534b. LED 562 may be the shape of a strip. LED 562 may be placed on the back side of top housing enclosure 560. The LED 562 may be outside the view of the vehicle cabin. LED 562 includes an LED wire 564. LED wire 564 may extend from LED to the housing platform aperture, passing through the support arm 520 and the base plate 510.

FIG. 8 shows an exemplary field of vision of an exemplary LiDAR mirror coupled to a semi-trailer truck. The semi-trailer truck is partially shown from a top view to facilitate better understanding the of the LiDAR mirror assembly's features. The semi-trailer truck includes a hood 820 that includes left side panel 805a and a right side panel 805b. Semi-trailer truck includes left headlight 810a and right headlight 810b located on the left side panel 805a and right side panel 805b, respectively. Semi-trailer truck includes a LiDAR mirror assembly 100. The semi-trailer truck may operate in an autonomous mode or a semi-autonomous mode when the semi-trailer truck is driven on a road to its destination. In the autonomous mode, a computer in the semi-trailer truck operates the various components (e.g., steering angle, LiDAR sensor, cameras, accelerator and/or brakes) to drive the semi-trailer truck on a road. In the semi-autonomous mode, a human driver drives the semi-trailer truck on the road and the vehicle's computer can override human operation in certain cases (e.g., the computer sends commands to engage brakes when the computer determines from a LiDAR sensor data that the semi-trailer truck will hit an object if brakes are not engaged). The left side panel 805a of the hood 820 is situated to the left of the trailer hood. The right side panel 805b of the hood 820 is situated to the right of the trailer hood. Left side panel 805a of the hood 820 includes left headlight 810a. Right side panel 805b of the hood 820 includes right headlight 810b. The left side panel 805a and the right side panel 805b of the hood 820 have a fender. The fender leaves an opening for wheels of the semi-trailer truck 805. In some embodiments, left side panel 805a and right side panel 805b of the hood 820 extends to the left headlight 810a and the right headlight 810b, respectively. The LiDAR mirror assembly 100 is structured to mount to or coupled to the left side panel 805a or right side panel 805b of the hood 820 above a fender. Thus, the LiDAR mirror assembly 100 is mounted on a periphery of a front side of a vehicle.

LiDAR mirror assembly 100 may be coupled to right side panel 805b of the hood 820. In some embodiments, LiDAR mirror assembly 100 has a horizontal view from the furthest right back corner of the semi-trailer truck to a point beyond the front right corner of the semi-trailer truck 805. In some embodiments, the LiDAR mirror assembly 100 has a horizontal field of view that is unobstructed by the front of the semi-trailer truck 805. In some embodiments, the LiDAR mirror assembly 100 has a 235° horizontal field of view. Placing LiDAR mirror assembly 100 near the front of the right side panel 805b of the hood 820 provides the LiDAR mirror assembly 100 with a field of view extending at least 55° to the left of the front right corner of the right side panel 805b of the hood 820. In some embodiments, the LiDAR mirror assembly 100 is situated above the front set of fenders of the autonomous semi-trailer truck, providing a greater vantage point and increasing the field of view of the LiDAR mirror assembly 100. The front set of fenders may be located below the headlights 810a, 810b. In some embodiments, the LiDAR mirror assembly 100 is mounted below the hood such that the housing of the LiDAR mirror assembly 100 extends above the hood. In some embodiments, the LiDAR mirror assembly 100 is mounted closer to the front of the semi-trailer truck than the opening for front wheels. In some embodiments, the LiDAR mirror assembly 100 is mounted closer to the front of the semi-trailer truck than the hubs of the front wheels. In some embodiments, the LiDAR mirror assembly 100 is structured to mount to the right side panel 805b above the fender and below the hood to maximize the field of view of the LiDAR mirror assembly 100.

LiDAR mirror assembly 100 may be coupled to left side panel 805a of the hood 820. In some embodiments, LiDAR mirror assembly 100 has a horizontal view from the furthest left back corner of the semi-trailer truck to a point beyond the front left corner of the semi-trailer truck 805. In some embodiments, the LiDAR mirror assembly 100 has a horizontal field of view that is unobstructed by the front of the semi-trailer truck 805. In some embodiments, the LiDAR mirror assembly 100 has a 235° horizontal field of view. Placing LiDAR mirror assembly 100 near the front of the left side panel 805a of the hood 820 provides the LiDAR mirror assembly 100 with a field of view extending at least 55° to the right of the front left corner of the left side panel 805a of the hood 820. In some embodiments, the LiDAR mirror assembly 100 is situated above the front set of fenders of the autonomous semi-trailer truck, providing a greater vantage point and increasing the field of view of the LiDAR mirror assembly 100. In some embodiments, the LiDAR mirror assembly 100 is mounted below the hood such that the housing of the LiDAR mirror assembly 100 extends above the hood. In some embodiments, the LiDAR mirror assembly 100 is mounted closer to the front of the semi-trailer truck than the opening for front wheels. In some embodiments, the LiDAR mirror assembly 100 is mounted closer to the front of the semi-trailer truck than the hubs of the front wheels. In some embodiments, the LiDAR mirror assembly 100 is structured to mount to the left side panel 805a above the fender and below the hood to maximize the field of view of the LiDAR mirror assembly 100.

Two LiDAR mirrors 100 may be coupled to both the left side panel 805a and the right side panel 805b simultaneously. In this configuration, the two LiDAR mirrors 100 has a horizontal view from the furthest left back corner of the semi-trailer truck to the front of the truck, extending to the furthest back right corner of the semi-trailer truck 805. In some embodiments, the two LiDAR mirrors 100 have a horizontal field of view that is unobstructed by the front of the semi-trailer truck 805. In some embodiments, the two LiDAR mirrors 100 have a horizontal field of view only obstructed by the back side of the semi-trailer truck 805. In some embodiments, each of the two LiDAR mirrors 100 can have a 235° horizontal field of view. Placing LiDAR mirror assembly 100 near the front of the left side panel 805a of the hood 820 and the right side panel 805b of the hood 820 provides both LiDAR mirrors 100 with a field of view covering the entire front side of the autonomous vehicle. In some embodiments, the field of view of both LiDAR mirrors overlap in front of the semi-trailer truck 805. In some embodiments, both LiDAR mirrors 100 are situated above the front set of wheels of the autonomous semi-trailer truck, providing a greater vantage point and increasing the field of view of both LiDAR mirrors 100. In some embodiments, both LiDAR mirrors 100 is mounted closer to the front of the semi-trailer truck than the fenders. In some embodiments, both LiDAR mirrors 100 are mounted below the hood such that the housing of the LiDAR mirrors 100 extends above the hood. In some embodiments, the LiDAR mirrors 100 are mounted closer to the front of the semi-trailer truck than the hubs of the front wheels. In some embodiments, the LiDAR mirror assembly 100 is structured to mount to the left side panel 805*a* above the fender and below the hood to maximize the field of view of the LiDAR mirror assembly 100.

FIG. 9 shows an exemplary field of vision of an exemplary LiDAR mirror coupled to a semi-trailer truck. The semi-trailer truck is partially shown from a side view to facilitate better understanding the of the LiDAR mirror assembly's features. The semi-trailer truck includes a hood 820 with left side panel 805*a* and a right side panel 805*b*. Semi-trailer truck includes left headlight 810*a* and right headlight 810*b*. Semi-trailer truck includes a hood situated above hood 820. Semi-trailer truck includes a LiDAR mirror assembly 100. The semi-trailer truck may operate autonomously or semi-autonomously, as explained above. The left side panel 805*a* of the hood 820 is situated to the left of the trailer hood. The right side panel 805*b* of the hood 820 is situated to the right of the trailer hood. Left side panel 805*a* of the hood 820 includes left headlight 810*a*. Right side panel 805*b* of the hood 820 includes right headlight 810*b*. The left side panel 805*a* and the right side panel 805*b* of the hood 820 have a fender. The fender leaves an opening for wheels of the semi-trailer truck 805. In some embodiments, left side panel 805*a* and right side panel 805*b* of the hood 820 extends to the left headlight 810*a* and the right headlight 810*b*, respectively. The LiDAR mirror assembly 100 is structured to mount to the left side panel 805*a* or right side panel 805*b* of the hood 820.

LiDAR mirror assembly 100 may be coupled to right side panel 805*b* of the hood 820. In some embodiments, LiDAR mirror assembly 100 has a vertical view extending from the ground to a point above the LiDAR mirror assembly 100. In some embodiments, the LiDAR mirror assembly 100 has a vertical field of view that is unobstructed by the front of the semi-trailer truck. In some embodiments, the LiDAR mirror assembly 100 has a 360° vertical field of view. In some embodiments, the LiDAR mirror is situated above the front set of wheels of the autonomous semi-trailer truck, providing a greater vantage point and increasing the vertical field of view of the LiDAR mirror. In some embodiments, the LiDAR mirror assembly 100 is mounted closer to the front of the semi-trailer truck 805 than the hub of the front wheels.

LiDAR mirror assembly 100 may be coupled to left side panel 805*a* of the hood 820. In some embodiments, LiDAR mirror assembly 100 has a vertical view extending from the ground to a point above the LiDAR mirror assembly 100. In some embodiments, the LiDAR mirror assembly 100 has a vertical field of view that is unobstructed by the front of the semi-trailer truck. In some embodiments, the LiDAR mirror assembly 100 has a 360° vertical field of view. In some embodiments, the LiDAR mirror is situated above the front set of wheels of the autonomous semi-trailer truck, providing a greater vantage point and increasing the vertical field of view of the LiDAR mirror. In some embodiments, the LiDAR mirror assembly 100 is mounted closer to the front of the semi-trailer truck than the hub of the front wheels.

Figure 10:
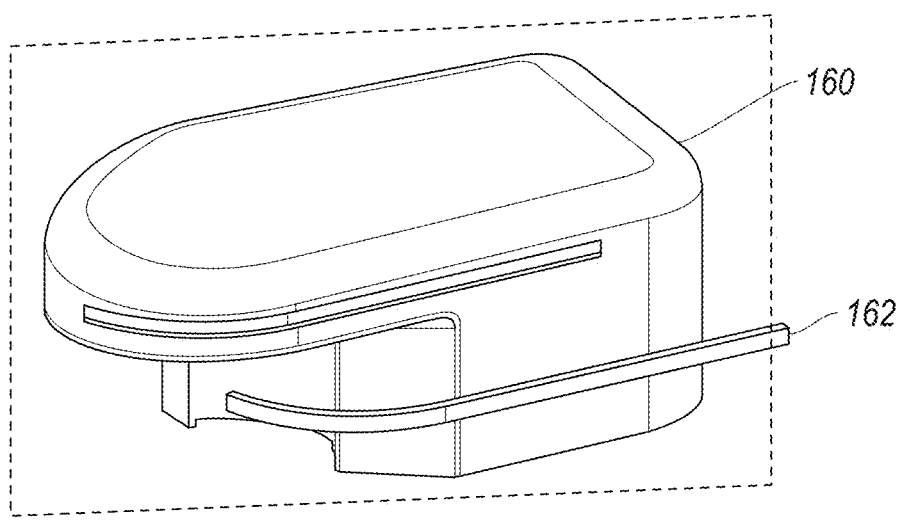
FIG. 10 shows an exemplary LiDAR housing with an LED.

FIG. 10 shows an exemplary LiDAR housing with an LED.

LED 164 is coupled to top housing enclosure 160. LED 164 may be an array of LEDs. LED 164 may be a solid-state semiconductor device that emits light. In some embodiments, the LED may be replaced with a more conventional light source such as incandescent bulbs or fluorescent lamps. Many of the embodiments described include the LED 164 attached to the LiDAR mirror assembly 100. But LED 164 may be attached to any other portion of semi-trailer truck 805.

LED 164 is representative of an autonomous mode of semi-trailer truck 805. LED 164 may present a status indicator that represents the mode of operation of semi-trailer truck 805. Modes of operation include autonomous, semi-autonomous, or human-controlled. Other modes of operation may be representative of the level of autonomy of the vehicle. Other modes of operation may correspond to the five levels of autonomous driving L0-L5: Level 0 (L0) corresponds to no automation; Level 1 (L1) corresponds to driver assistance systems; Level 2 (L2) corresponds to partial automation driving where systems can take control; Level 3 (L3) corresponds to high autonomous driving in which the driver may disengage from driving for extended periods of time; Level 4 (L4) corresponds to fully automated driving where the vehicle drives independently most of the time; and Level 5 (L5) corresponds to a fully autonomous vehicle.

LED 164 may represent an autonomous mode of semi-trailer truck 805 by presenting a status indicator. A status indicator may be a color where each color corresponds to a mode of operation. A status indicator may be a sound where each sound corresponds to a mode of operation. A status indicator may be a pattern of light corresponding to a mode of operation. The pattern of light may power LED 164 on and off at a particular rhythm. In a plurality of LEDs, the pattern of light may be displayed by turning on or off multiple LEDs either simultaneously or sequentially. A status indicator may be an intensity of light where each intensity corresponds to a mode of operation. Where LED 165 is an array of LEDs, the position of the powered LED corresponds to a mode of operation.

LED 164 may emit a light in the visible spectrum. Alternatively, LED 164 may emit an infrared light or ultraviolet light. Light emitted from LED 164 that falls outside the range of wavelengths visible to the human eye may communicate the status of the autonomous vehicle. In some embodiments, the light emitted from LED 164 may be modulated to communicate a status of the autonomous vehicle.

LED 164 may be placed outside the field of view of the cabin of the vehicle. LED 164 may be placed on the back side of the LiDAR mirror assembly 100. A driver inside the cabin of the vehicle will not be distracted by LED 164 by having the LED emit light away from the driver.

Figure 11:
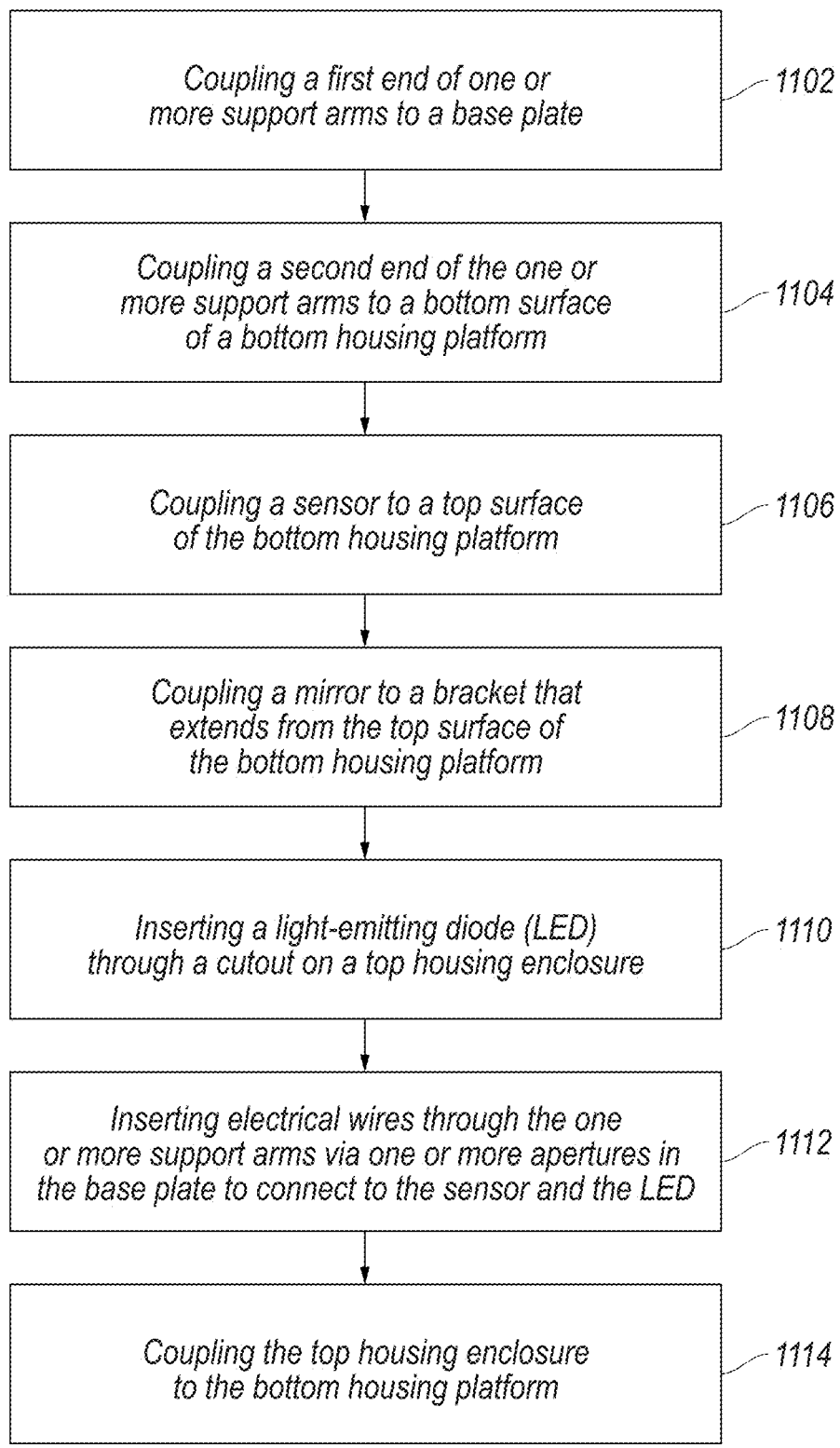
FIG. 11 shows an example flowchart for assembling a sensor device.

FIG. 11 shows an example flowchart for assembling a sensor device. At the coupling operation 1102, a first end of one or more support arms is coupled to a base plate. At the coupling operation 1104, a second end of the one or more support arms is coupled to a bottom surface of a bottom housing platform. At the coupling operation 1106, a sensor is coupled to a top surface of the bottom housing platform. The bottom housing platform has a first end proximal to the base plate and a second end distal to the base plate, and the sensor is located at the second end of the bottom housing platform. At the coupling operation 1108, a mirror is coupled to a bracket that extends from the top surface of the bottom housing platform. At the inserting operation 1110, a light-emitting diode (LED) is inserted through a cutout on a top housing enclosure. At the inserting operation 1112, electrical wires from the vehicle are inserted through the one or more support arms via one or more apertures in the base plate to connect to the sensor and the LED. At the coupling operation 1114, the top housing enclosure is coupled to the bottom housing platform. The top housing enclosure has a first end proximal to the base plate and a second end distal to the base plate, and the second end of the top housing enclosure has an opening through which at least some surface of the sensor is exposed.

In some embodiments, the one or more support arms are oriented at an oblique angle with respect to a surface of the base plate. In some embodiments, a first shape of an exterior surface of the top housing enclosure is the same as a second shape of an exterior surface of the bottom housing platform. In some embodiments, the sensor is a light detection and ranging (LiDAR) sensor. In some embodiments, the method of FIG. 11 further comprises coupling the base plate to a hood of a vehicle. In some embodiments, the at least some surface of the sensor is recessed from an edge of the top housing enclosure at the second end.

A vehicle described in this patent document may take the form of a car, truck, motorcycle, bus, for example. The vehicle may be configured to operate fully or partially in an autonomous mode. For example, the vehicle may control itself while in the autonomous mode, and may be operable to determine a current state of the vehicle and its environment, determine a predicted behavior of at least one other vehicle in the environment, determine a confidence level that may correspond to a likelihood of the at least one other vehicle to perform the predicted behavior, and control the vehicle based on the determined information. While in autonomous mode, the vehicle may be configured to operate without human interaction.

The vehicle may include an electrical system that may transfer and control electrical signals in the vehicle. These electrical signals can be used to activate lights, servos, electrical motors, and other electrically driven or controlled devices of the vehicle. The power source may represent a source of energy that may, in full or in part, power the engine or motor. That is, the engine or motor could be configured to convert the power source into mechanical energy. Examples of power sources include gasoline, diesel, other petroleum-based fuels, propane, other compressed gas-based fuels, ethanol, fuel cell, solar panels, batteries, and other sources of electrical power. The power source could additionally or alternatively include any combination of fuel tanks, batteries, capacitors, or flywheels. The power source may also provide energy for other subsystems of the vehicle.

In this patent document, common or similar features may be designated by common reference numbers. As used herein, "exemplary" may indicate an example, an implementation, or an aspect, and should not be construed as limiting or as indicating a preference or a preferred implementation. This patent documents describes features of the LiDAR mirror assembly 100 separately from the features of the LiDAR mirror assembly 500 for ease of description. The features of first exemplary embodiment of the LiDAR mirror assembly 100 can be implemented in the features of the second exemplary embodiment of the LiDAR mirror assembly 500, and vice versa.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A device comprising:
   a base plate;
   a housing comprising a top housing enclosure coupled to a bottom housing platform,
      wherein the bottom housing platform is coupled to the base plate via a support arm,
      wherein the support arm includes a first end coupled to the bottom housing platform and a second end coupled to the base plate,
      wherein the top housing enclosure and the bottom housing platform having a first end proximal to the base plate and a second end distal to the base plate,
      wherein the second end of the top housing enclosure has an opening within which a sensor is located and coupled to the housing,
      wherein the opening extends from a first side surface of the top housing enclosure to a second side surface of the top housing enclosure,
      wherein the second side surface is opposite to the first side surface, and
      wherein at least some surface of the sensor is exposed through the opening; and
   a mirror pivotably coupled to the housing and located on a same side as the first side surface of the top housing enclosure at the first end.

2. The device of claim 1, wherein the support arm is oriented at an oblique angle with respect to a surface of the base plate.

3. The device of claim 1, wherein the base plate includes an aperture, and wherein the second end of the support arm is coupled to the base plate at the aperture.

4. The device of claim 1, wherein the support arm has a hollow cylindrical shape.

5. The device of claim 1, wherein the mirror is pivotably coupled to the housing via a bracket that extends from a top surface of the bottom housing platform.

6. The device of claim 1, wherein the second end of the top housing enclosure and the bottom housing platform has a semi-circular shape that extends from the first side surface to the second side surface.

7. The device of claim 1, wherein the sensor is a light detection and ranging (LiDAR) sensor.

8. The device of claim 1,
   wherein the top housing enclosure includes a cutout on the second side surface,
   wherein the cutout extends laterally along the second side surface, and
   wherein the cutout includes a light-emitting diode (LED).

9. The device of claim 1, further comprising:
a second support arm including a first end coupled to the bottom housing platform and a second end coupled to the base plate is coupled to the base plate via a support arm,
wherein the first end of the support arm and the first end of the second support arm are coupled to different regions of the bottom housing platform, and
wherein the second end of the support arm and the second end of the second support arm are coupled to different regions of the base plate.

10. The device of claim 1, wherein the at least some surface of the sensor is recessed from an edge of the top housing enclosure at the second end.

11. A system, comprising:
a vehicle operable to drive on a road, the vehicle comprising a light detection and ranging (LiDAR) assembly mounted on a periphery of a front side of the vehicle, wherein the LiDAR assembly comprises:
a base plate, wherein the base plate is coupled to a hood of the vehicle;
a housing comprising a top housing enclosure coupled to a bottom housing platform,
wherein the bottom housing platform is coupled to the base plate via a support arm,
wherein the support arm includes a first end coupled to the bottom housing platform and a second end coupled to the base plate,
wherein the top housing enclosure and the bottom housing platform having a first end proximal to the base plate and a second end distal to the base plate,
wherein the second end of the top housing enclosure has an opening within which a LiDAR sensor is located and coupled to the housing,
wherein the opening extends from a first side surface of the top housing enclosure to a second side surface of the top housing enclosure,
wherein the second side surface is opposite to the first side surface, and
wherein at least some surface of the LiDAR sensor is exposed through the opening; and
a mirror pivotably coupled to the housing and located on a same side as the first side surface of the top housing enclosure at the first end.

12. The system of claim 11, wherein the support arm is oriented at an oblique angle with respect to a surface of the base plate.

13. The system of claim 11, wherein the base plate includes an aperture, and wherein the second end of the support arm is coupled to the base plate at the aperture.

14. The system of claim 11, wherein the at least some surface of the LiDAR sensor is recessed from an edge of the top housing enclosure at the second end.

* * * * *